United States Patent [19]
Chiu

[11] Patent Number: 4,592,918
[45] Date of Patent: * Jun. 3, 1986

[54] TAR-DEPLETED AQUEOUS LIQUID SMOKE COMPOSITION

[75] Inventor: Herman S. Chiu, Chicago, Ill.

[73] Assignee: Union Carbide Corporation, Danbury, Conn.

[*] Notice: The portion of the term of this patent subsequent to Mar. 12, 2002 has been disclaimed.

[21] Appl. No.: 556,460

[22] Filed: Nov. 30, 1983

Related U.S. Application Data

[60] Division of Ser. No. 417,171, Sep. 14, 1982, abandoned, which is a continuation-in-part of Ser. No. 312,364, Oct. 16, 1981, abandoned, which is a continuation-in-part of Ser. No. 62,358, Jul. 31, 1979, abandoned.

[51] Int. Cl.$^4$ .................. A23B 4/04; A23L 1/221; A23L 2/28
[52] U.S. Cl. .................. 426/533; 426/105; 426/129; 426/315; 426/650; 426/651
[58] Field of Search ............... 252/305; 426/650, 651, 426/533, 315

[56] References Cited

U.S. PATENT DOCUMENTS

| | | | |
|---|---|---|---|
| 3,106,473 | 10/1963 | Hollenbeck | 426/650 |
| 3,663,237 | 5/1972 | Moller | 426/315 |
| 3,922,367 | 11/1975 | Gorbatov et al. | 426/650 X |
| 4,104,408 | 8/1978 | Chiu | 426/650 X |
| 4,359,481 | 11/1982 | Smits | 426/533 |
| 4,504,507 | 3/1985 | Nicholson | 426/650 X |

FOREIGN PATENT DOCUMENTS

| | | |
|---|---|---|
| 151768 | 9/1950 | Austria . |
| 1492639 | 9/1971 | Fed. Rep. of Germany . |

*Primary Examiner*—Richard D. Lovering
*Attorney, Agent, or Firm*—John C. Lefever

[57] ABSTRACT

A tar-depleted aqueous liquid smoke composition with smoke coloring and smoke flavoring capability and a tubular food casing with the composition applied on a surface thereof.

8 Claims, 9 Drawing Figures

TAR-DEPLETED AQUEOUS LIQUID SMOKE COMPOSITION

REFERENCE TO RELATED APPLICATIONS

This application is a division of prior U.S. application Ser. No. 417,171 filing date Sept. 14, 1982 and now abandoned and which is a continuation in part of application Ser. No. 312,364 filing date Oct. 16, 1981, and now abandoned and which is a continuation in part of application Ser. No. 062,358 filing date July 31, 1979 and now abandoned. Application Ser. No. 417,172 entitled "Tar-Depleted Liquid Smoke treatment of Food Casings", is filed contemporaneously with this application in the name of Myron Donald Nicholson, now U.S. Pat. No. 4,431,032, application Ser. No. 417,173, also entitled "Tar-Depleted Liquid Smoke of Food Casings", is also filed contemporaneously with this application in the name of Myron Donald Nicholson now U.S. Pat. No. 4,431,033, and application Ser. No. 261,457 entitled "Liquid Coating Method and Apparatus" was filed May 7, 1981 in the names of Chiu et al, now U.S. Pat. No. 4,356,218.

BACKGROUND OF THE INVENTION

1. Field of the Invention

This invention relates to: (a) a smoke color, odor and flavor capability, (b) a tar-depleted liquid smoke treated food casing, and (c) a method for preparing a smoke colored food product.

2. Description of the Prior Art

Tubular cellulosic food casings are used extensively for processing a great variety of meat products and other food items. The food casings are generally thin-walled tubing of various diameters prepared from reconstituted materials, such as regenerated cellulose. Cellulosic food casings may also be prepared with fibrous webs embedded in the wall thereof, such casings commonly being referred to as "fibrous food casings."

The many different recipes and modes of processing that are used by the processed food industry to suit different tastes, and even regional preferences, generally necessitate the use of food casings with a variety of characteristics. In some instances, for example, food casings are required to have multifunctional uses wherein they serve as containers during the processing of a food product encased therein, and then also serve as a protective wrapping for the finished product. In the processed meat industry, however, the food casings used in the preparation of many types of meat products, such as various types of sausages, frankfurters, bolognas, beef rolls, hams and the like, are frequently removed from about the processed meat product prior to slicing and/or final packaging.

Surface appearance and flavor are important factors in the commercial and consumer acceptance of processed meat products, and a common feature of most varieties of such products involves the use of "smoking" for imparting characteristic flavor and color thereto. The "smoking" of food products is generally accomplished by the food processor subjecting the food product to actual contact with smoke in a gaseous or cloud-like form. Such "smoking" processes, however, have not been considered completely satisfactory for a variety of reasons, including the inefficiencies and lack of uniformity of the "smoking" operation. Because of the shortcomings experienced, many meat packers now employ various types of liquid aqueous solutions of wood-derived smoke constituents, commonly called "liquid smoke solutions" that have been developed and used commercially by the food processor in the processing of many types of meat and other food products. For convenience in this specification, the as-purchased "liquid smoke solution" will be frequently referred to as "as-is" liquid smoke.

The application of "liquid smoke solutions" to meat products is generally carried out in a variety of ways, including spraying or dipping an encased food product during the processing thereof, or by incorporating the "liquid smoke solution" in the recipe itself. The actual operation of "smoking" by spraying or dipping is not completely satisfactory due to inability to treat the encased product uniformly, and incorporation of "liquid smoke solutions" in the meat recipe does not always provide the desired surface appearance because of dilution of smoke ingredients. Incorporation in the recipe also reduces the stability of the meat emulsion, and will adversely affect taste if high concentrations are used. Application of liquid smoke to encased food products by the food processor, such as by spraying or dipping, also causes unwanted pollution and equipment corrosion problems for the food processor. In addition, encased sausages treated by application of the liquid smoke during commercial processing have been found to yield, after peeling the casing from the treated encased food product, sausages which are lacking in smoke color uniformity from sausage to sausage, and from batch of sausages to batch of sausages. What is even more undesirable is the lack of uniformity of coloration which often appears on the surface of the same sausage, including light and dark streaks, light and dark blotches, and even uncolored spots which especially appear at the ends of sausages.

It has also been suggested, as for example disclosed in U.S. Pat. No. 3,330,669 to Hollenbeck, that application of a viscous liquid smoke solution to the inside surface of a deshirred tubular food casing by the food processor immediately prior to stuffing the casing with a sausage emulsion, results in preparation of processed food products which exhibit acceptable color and smoky flavor after cooking and removal of the casing. However, the Hollenbeck procedure has not been found practical and is not used commercially. The viscous liquid smoke solution disclosed by Hollenbeck is not practical for coating a casing on a high speed production line to produce a coated casing which can then be shirred by conventional methods and used as a shirred casing on an automatic stuffing machine. The high viscosity of the Hollenbeck coating solution limits the casing coating speed and, if a conventional method such as "slugging", also called "bubble coating", is used to coat the inside of casing, the viscous Hollenbeck coating necessitates frequently cutting the casing open to replenish the slug of coating material within the casing, which results in short lengths of casing and thus makes continuous shirring impractical.

Heretofore, however, it has been found that providing casings which afford special treatment or structural characteristics to the food product can be more uniformly and economically accomplished by the casing manufacturer. This is especially true with the advent of, and wide commercial use of, automatic stuffing and processing equipment in the processed food industry.

Several methods of providing food casings with coatings applied to a surface thereof are known and described in the patent literature. There is disclosed, for example, in. U.S. Pat. No. 3,451,827 a spraying method for applying a variety of coating materials over the internal surface of small diameter casings. In U.S. Pat. No. 3,378,379 to Shiner et al., a "slugging" method is used for applying coating materials to the internal surface of large diameter casings. While such techniques and others have been used in preparing commercial quantities of a variety of coated food casings, including casings where liquid smoke is employed as a component in the coating composition, the casings produced thereby have been designed to meet particular commercial requirements and, to the best of my knowledge, none of the prior art coated casings disclosed have been known to successfully impart a satisfactory level of "smoke" flavor and color to a meat product processed therein. For example, in U.S. Pat. No. 3,360,383 to Rose et al. and in U.S. Pat. No. 3,383,223 and 3,617,312 to Rose, there are disclosed coating compositions of various protein materials, such as gelatin, that employ liquid smoke solutions in amounts specifically required to insolubilize the protein materials. Such coated casings are disclosed as exhibiting special adhesion properties required for the processing of dry sausages, which properties would therefore limit the suitability thereof for many other casing applications.

The prior art patents teach application of liquid smoke to the internal surface of a casing, but attempts to internally coat the casing during the manufacture thereof have been found to be costly and to limit the speed of a continuous high speed production line.

One solution to this problem as described and claimed in my previously referenced copending U.S. application Ser. No. 062,358, now abandoned involves treating the external surface of the food casing with an aqueous liquid smoke composition derived from natural wood. I also discovered that when the food casing is cellulosic and formed of either non-fibrous gel stock or fibrous gel stock, the use of highly acidic (pH of 2.0 to 2.5) aqueous liquid smoke results in the formation of a tarry deposit accumulating on the carrier rolls and the squeeze rolls of the smoke treatment unit, thereby eventually forcing shutdown of the treating system.

One object of this invention is to provide an aqueous liquid smoke composition which has high capability for imparting smoke color, odor and flavor to foodstuffs, and which does not result in the formation of tar during its treatment of gel stock food casings.

Another object is to provide a liquid smoke-treated tubular food casing without the aforementioned tar problem.

Other objects and advantages of this invention will become apparent from the ensuing disclosure and appended claims.

SUMMARY OF THE INVENTION

One aspect of the invention is a tar-depleted aqueous liquid smoke composition with smoke color, odor and flavor capability having an absorptive power (defined hereinafter) of at least about 0.15 and preferably at least about 0.25 at 340 nm. wave length, and having a light transmittance of at least about 50%. As will be explained hereinafter in detail, "absorptive power" is a measure of the liquid smoke's coloring capability and "light transmittance" is a measure of the liquid smoke's tar content. As used herein, "light transmittance" of aqueous liquid smoke refers to the latter's intrinsic light transmittance without addition of materials which may significantly affect the percent light transmittance.

Another aspect of the invention is a tar-depleted liquid smoke treated tubular food casing with a tar depleted liquid smoke coating derived from tar-containing liquid smoke. This coating is applied on a casing wall in sufficient quantity to provide an absorptive index (defined hereinafter) of at least about 0.2 at 340 nm. wave length due to the smoke coloring and smoke flavoring constituents. Also, the coating provides the casing with an extract having an ultraviolet absorbance at 210 nm. wave length which is no more than about 60% of the absorbance obtained for an extract from an identical casing having a coating of the original as-is tar-containing liquid smoke and substantially the same absorptive index as the tar-depleted smoke treated tubular food casing. As will be explained hereinafter in detail, "absorptive index" is a measure of the casing's ability to impart smoke color to encased foodstuff, and "ultraviolet absorbance" is a measure of the casing's tar content.

In a preferred tar-depleted liquid smoke treated food casing of this invention, the casing is the "gel stock" type as will be subsequently explained in detail, and also is formed of cellulose without fiber reinforcement. The casing has a tar-depleted liquid smoke coating which is derived from tar-containing liquid smoke having a total acid content of at least about 10 weight % and which is applied on a casing surface in sufficient quantity to provide an absorptive index of at least about 0.2 at 340 nm. wave length, and a haze value which is no more than the haze value for an identical casing without the liquid smoke coating. As will be explained hereinafter in detail, "total acid content" is a qualitative measure of the staining power of both tar-containing liquid smokes and tar-depleted liquid smokes prepared therefrom. Also as hereinafter explained in detail, "haze value" is a measure of the tar content in gel stock nonfibrous casings having a tar-depleted liquid smoke coating which is derived from tar-containing liquid smoke having a total acid content of at least 10 weight %.

The tar-depleted aqueous liquid smoke may be prepared by any of several methods which are not known to the prior art, and which do not constitute part of this invention. One suitable method, described in my previously referenced copending application Ser. No. 62,358, now abondoned, involves at least partially neutralizing the as-is liquid smoke by mixing a high pH constituent therewith in sufficient quantity to raise the pH of the liquid smoke above about 4. A tar-enriched fraction and a tar-depleted liquid smoke are formed, then separated, and the latter comprises a tar depleted aqueous liquid smoke of this invention. This preparative method will be hereinafter referred to as the "Neutralization Method".

Another suitable method for preparing the tar-depleted aqueous liquid smoke of this invention is described in previously referenced copending application Ser. No. 417,172, entitled "Tar-Depleted Liquid Smoke Treatment of Food Casings," filed contemporaneously with this application in the name of M. D. Nicholson now U.S. Pat. No. 4,431,033, incorporated herein to the extent pertinent. This method, hereinafter referred to as the "Controlled Temperature Neutralization Method," is based on the discovery that during neutralization by mixing a high pH constituent with tar-containing liquid smoke, the heat of neutralization increases the liquid temperature from an ambient level on the order of 20°

C. to a level as high as 55°-60° C., and further that the staining power and/or absorptive power of the resulting at least partially neutralized liquid smoke is somewhat diminished because of the elevated temperature. This diminishment may be partially avoided by maintaining the temperature below about 40° C. during neutralization, and with the Controlled Temperature Neutralization Method, the absorptive power and staining power do not decline to nearly the same extent.

Still another suitable method for preparing the tar-depleted aqueous liquid smoke of this invention is described in another previously referenced copending application, Ser. No. 417,173 entitled "Tar-Depleted Liquid Smoke Treatment of Food Casings," filed contemporaneou with this application in the name of M. D. Nicholson, now U.S. Pat. No. 4,431,033, and incorporated herein to the extent pertinent. By this method, a tar-containing liquid smoke having an absorptive power of at least about 0.2 at 340 nm wave length, is contacted with an organic liquid solvent which is either nonreactive with this liquid smoke solution or reactive therewith to form a derivative liquid solvent. The liquid solvent is immiscible in the aqueous liquid smoke solution. The liquid solvent has a hydrogen bonding solubility parameter in the liquid smoke environment of at least about 2.7. A preferred solvent is methylene dichloride. The liquid smoke solution and the liquid solvent are contacted in a volume ratio of between about 1:1 and 65:1 of liquid smoke solution to liquid solvent, depending on the individual constituents, under extraction conditions to form a tar-enriched liquid solvent fraction and a tar-depleted liquid smoke fraction. The fractions are separated and the latter is recovered as the tar-depleted aqueous liquid smoke of this invention, the aforedescribed preparative method being hereinafter referred to as the "Solvent Extraction Method."

The tar-depleted and tar-enriched portions produced by these methods may be separated by any of several methods well-known to those skilled in the art. These methods include filtration, gravity decanting, liquid cycloning, and centrifugal decanting, as well as the use of various types of extraction systems for the Solvent Extraction Method.

Still another aspect of this invention involves a method for preparing a smoke colored food product in which a tubular food casing is provided having a tar-depleted smoke coating derived from tar-containing liquid smoke. The latter is applied on a casing surface in sufficient quantity to provide an absorptive index of at least about 0.2 at 340 nm. wave length. Also, the tar-depleted smoke coating provides the casing extract with an ultraviolet absorbance at 210 nm. wave length which is no more than about 60% of the absorbance for the extract from an identical casing having a coating of the tar-containing liquid smoke and substantially the same absorptive index as the tar-depleted liquid smoke treated tubular food casing. This liquid smoke treated casing is stuffed with unprocessed foodstuff. Then the stuffed and liquid smoke treated casing is processed to convert the foodstuff into edible food product and form smoke color on the resulting food product surface.

DESCRIPTION OF THE PREFERRED EMBODIMENTS

Figure 1:
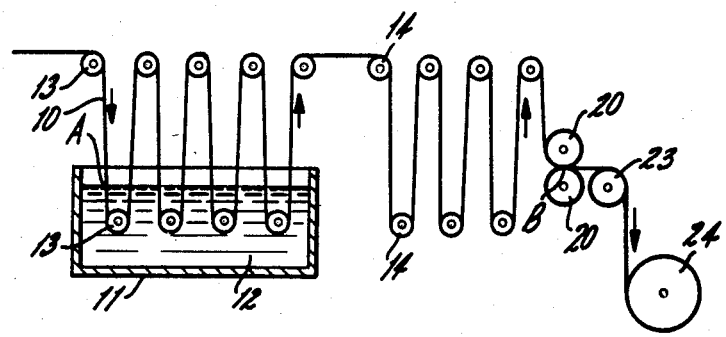
FIG. 1 is a schematic view of apparatus suitable for treatment of food casing external surface with tar-depleted liquid smoke in accordance with one embodiment of this invention.

Food casings that are suitable for use in the present invention are tubular casings, and preferably tubular cellulosic casings, that are prepared by any one of the methods well known in the art. Such casings are generally flexible, thin-walled seamless tubing formed of regenerated cellulose, cellulose ethers such as hydroxyethyl cellulose, and the like, in a variety of diameters. Also suitable are tubular cellulosic casings having a fibrous reinforcing web embedded in the wall thereof, which are commonly called "fibrous food casings", as well as cellulosic casings without the fibrous reinforcement, herein referred to as "non-fibrous" cellulosic casings.

Casings conventionally known as "dry stock casings" may be used in the practice of this invention. Such casings generally have a water content within the range of from about 5 to about 14 weight percent water if non-fibrous casing, or within the range of from about 3 to about 8 weight percent water if fibrous casing, based on the total weight of casing including water.

Casings conventionally known as "gel stock casings" are casings which have higher moisture contents since they have not been previously dried, and such casings may also be used in the practice of this invention. Gel stock casings, whether fibrous or non-fibrous, are the type exhibiting the aforementioned tarring problem when treated by as-is liquid smoke.

Smoke color, odor and flavor constituents suitable for use in accordance with the present invention are generally those designated as being the color, odor and flavor constituents of as-is liquid smoke.

The term "solution" as used herein is meant to encompass homogeneous true solutions, emulsions, colloidal suspensions and the like.

Liquid smoke often is a solution of natural wood smoke constituents prepared by burning a wood, for example, hickory or maple, and capturing the natural smoke constituents in a liquid medium such as water. Alternatively, the liquid smoke to be used may be derived from the destructive distillation of a wood, that is, the breakdown or cracking of the wood fibers into various compounds which are distilled out of the wood char residue. Aqueous liquid smokes are generally very acidic, usually having a pH of 2.5 or less and a titratable acidity of at least 3% by weight.

Reference to the term "smoke coloring and smoke flavoring constituents", as used throughout this specification and in the appended claims with respect to the liquid smoke compositions and casings of this invention, is intended to refer to, and should be understood as referring to, the smoke coloring and flavoring constituents derived from liquid smoke solutions in their commercially available form.

The tar-depleted liquid smoke of this invention is derived from natural wood smoke constituents. The source liquid smoke is generally produced by the limited burning of hardwoods and the absorption of the smoke so generated, into an aqueous solution under controlled conditions. The limited burning keeps some of the undesirable hydrocarbon compounds or tars in an insoluble form, thereby allowing removal of these constituents from the final liquid smoke. Thus, by this procedure, the wood constituents previously considered desirable by the manufacturer of the liquid smoke are absorbed into the solution in a balanced proportion and the undesirable constituents may be removed. The resultant liquid smoke solution still contains a significant concentration of tars, because the manufacturers and users of the liquid smoke consider the dark colored tars to be necessary from the standpoint of imparting smoke color and flavor to foodstuffs. This resultant liquid smoke solution is representative of the whole spectrum of wood derived smoke colors and flavors that are available. Table A lists several commercially available tar-containing liquid wood smokes along with several characteristics deemed important for purposes of this invention (discussed hereinafter). The apparatus and method for manufacturing typical liquid smokes of the preferred type is more fully described in U.S. Pat. Nos. 3,106,473 to Hollenbeck and 3,873,741 to Melcer et al.

As used herein, the term "at least partially neutralized" is intended to refer to liquid smoke compositions having a pH greater than about 4, preferably having a pH within the range of from about 5 to about 9, and more preferably having a pH within the range of from about 5 to about 6.

It has been found that the commercially available liquid smoke solutions are generally highly acidic, as discussed previously, and that they may, therefore, interfere with peelability of the casings if a peeling aid such as carboxymethyl cellulose is used. To alleviate this problem, a tar-depleted at least partially neutralized liquid smoke may be employed in the practice of this invention.

TABLE A

| Manufacturers Designation | Commercially Available Liquid Wood Smokes | | | | |
| --- | --- | --- | --- | --- | --- |
| | Total Acid Content[e] % | Total Solid % | % Light Transmittance | Staining Power | Absorptive Power[d] |
| Royal Smoke AA[a] | 11.5–12.0 | 10.2 | 0 | 0.034 | 0.68 |
| Royal Smoke A[a] | 10.5–11.0 | 9.0 | 0 | 0.029 | 0.42 |
| Royal Smoke B[a] | 8.5–9.0 | 8.8 | 0 | 0.025 | 0.36 |
| Royal Smoke 16[a] | 10.0–10.5 | 17.6 | 0 | 0.026 | 0.62 |
| Charsol C-12[b] | 12.0–12.5 | 8.3 | 0 | 0.031 | 0.54 |
| Charsol C-10[b] | 11.5 | not reported | 0 | 0.028 | 0.40 |
| Charsol X-11[b] | 10.0 | 5.8 | 0 | 0.022 | 0.36 |
| Charsol C-6[b] | 6.7 | 4.8 | 73 | 0.016 | 0.22 |
| Charsol C-3[b] | 3.6 | 1.0 | 98 | 0.007 | 0.12 |
| Smokaroma | | | | | |
| Code - 12[c] | 12.0 | 10.5 | 0 | 0.034 | — |
| Code - 10[c] | 10.2 | 5.1 | 0 | 0.027 | — |
| Code - S[c] | 8.0 | 2.4 | 26 | 0.017 | — |
| Code - 6[c] | 6.2 | 1.9 | 75 | 0.014 | — |

[a]Griffith Laboratories, Inc. 12200 South Central Avenue, Alsip, IL
[b]Red Arrow Products Co., P.O. Box 507, Manitowoc, WI
[c]Meat Industry Suppliers, Inc. 770 Frontage Road, Northfield, IL
[d]Measured at 340 nm
[e]Also referred to as "Total Acidity"

The tar-depleted liquid smoke may be applied to the outer surface of the tubular casing by passing the casing through a bath of the tar-depleted liquid smoke composition. The liquid smoke is allowed to soak into the casing prior to doctoring off any excess liquid smoke by passing the casing through squeeze rolls or wipers, and the like, for an amount of time sufficient for the casing to incorporate the desired amount of smoke coloring and smoke flavoring constituents. The process of passing the casing through a treatment bath, also referred to in the art as a "dip bath" or a "dip tank," may also be referred to in the art as a "dipping" step. The tar-depleted liquid smoke composition may alternatively be externally applied to the casing by methods other than dipping, such as spraying, brushing, roll-coating, and the like.

Alternatively, the tar-depleted liquid smoke composition may be applied to the internal surface of the casing by any of several well-known procedures described in U.S. Pat. No. 4,171,381 to Chiu, the disclosure of which is incorporated by reference. These include slugging or bubble coating, spraying, and coating while shirring. The slugging method for coating the inside of a casing involves filling a portion of the casing with the coating material, so that the slug of coating material generally resides at the bottom of a "U" shape formed by the casing being draped over two parallel rollers, and then moving the continuous indefinite length of casing so that the slug of coating material remains confined within the casing, while the casing moves past the slug and is coated on its inside wall by the coating material contained within the slug.

It may then be shirred by conventional methods, or prior to shirring, it may be dried and/or humidified to a water content suitable for shirring and/or further processing. The need for conventional drying and/or humidification after the preferably external tar-depleted liquid smoke treatment depends on the water content of the casing after treatment and the type of casing. If the casing is a non-fibrous casing, a water content within the range of from about 8 weight percent to about 18 weight percent water immediately before shirring is typical, and for fibrous casing a water content within the range of from about 11 weight percent to about 35 weight percent water immediately before shirring is typical, where percent is based on the total weight of casing including water.

One method of treating the casing with the tar-depleted liquid smoke of this invention is shown in FIG. 1. In FIG. 1, a flattened, tubular, cellulosic sausage casing 10, is externally treated with a tar-depleted liquid smoke composition during its passage over lower and upper guide rolls 13 through dip tank 11 which contains the tar-depleted liquid smoke composition 12. The casing passes over lower and upper guide rolls 14 after exiting the dip tank, and then passes between squeeze rolls 20 which minimize any excess carry-over of the liquid smoke composition. The total contact time of the casing 10 with the tar-depleted liquid smoke composition 12 in the dip tank 11, and with excess liquid smoke composition on the casing passing over the guide rolls 14 before the casing passes through the squeeze rolls 20, will determine the amount of smoke coloring and smoke flavoring constituents of the tar-depleted liquid smoke composition that the casing will incorporate. The total contact time is measured from point A to point B in FIG. 1. After the casing passes through squeeze rolls 20, it passes over guide roll 23 and is wound up on reel 24. The casing is then sent on to conventional further processing, including conventional humidification, as may be required, and conventional shirring.

Figure 2:
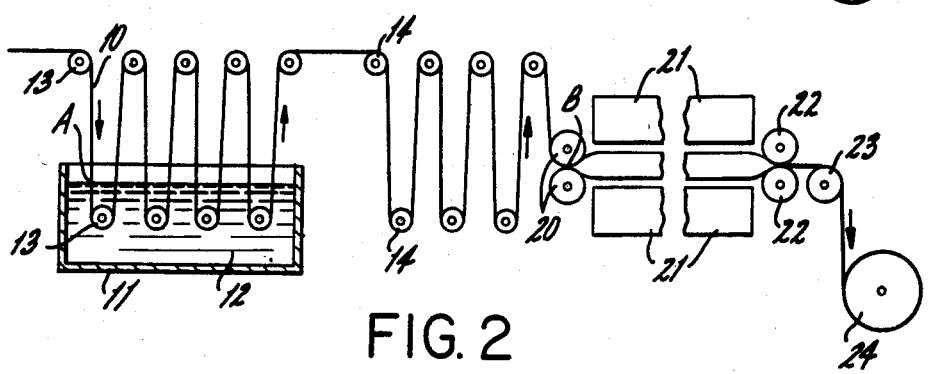
FIG. 2 is a schematic view of apparatus similar to and performing the same functions as the FIG. 1 apparatus, but with a chamber for partially drying the tar-depleted liquid smoke treated casing to a desired moisture content while in an inflated condition.

The embodiment illustrated in FIG. 2 differs from that illustrated in FIG. 1, in that in FIG. 2 the casing after passing through squeeze rolls 20 is passed into a heating and drying chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device, such as circulating hot air chambers, which will dry the sausage casing to the proper moisture content. After the casing passes out of the heating chamber 21 and through squeeze rolls 22, it passes over guide roll 23 and is wound up on reel 24. The casing is then sent on to conventional further processing, including conventional humidification, as may be required, and conventional shirring.

Figure 3:
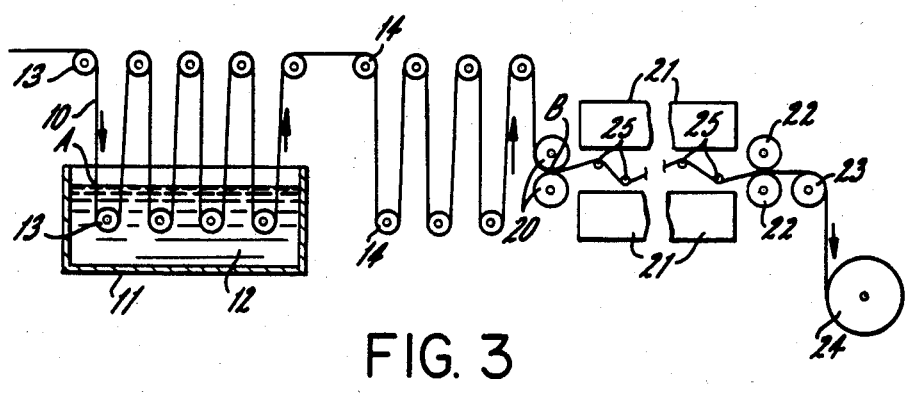
FIG. 3 is a schematic view of apparatus similar to and performing the same function as the FIG. 2 apparatus but with means for partial drying of the tar-depleted liquid smoke treated casing while in a flat condition.

The embodiment illustrated in FIG. 3 differs from that illustrated in FIG. 2, in that in FIG. 3 the casing is dried in a flat condition while passing over guide rolls 25.

It is to be noted that the tar-depleted liquid smoke which is coated on the casing surface, whether externally coated or internally coated, does not exist solely as a surface coating. Smoke color, odor and flavor constituents which are coated on the surface penetrate the cellulosic structure of the casing as the cellulose absorbs the moisture of the smoke solution. Inspection of the cross-section of the casing wall discloses a color gradation across the casing wall, with the smoke treated surface having a darker color than the surface on the opposite side of the casing wall. Accordingly, as used herein, the term "coating" is to be understood to mean that the casing wall is not only coated with smoke constituents but that the casing wall is also impregnated with smoke constituents.

The tar-depleted liquid smoke compositions of the present invention may also contain other ingredients which may be suitably used in treating a tubular food casing, to which the smoke constituents are applied, e.g., glycerine and/or propylene glycol which may be used as humectants or softening agents, and the like.

Other ingredients which are normally used in the manufacture of, or for further treatment of the food casings, e.g., cellulose ethers and mineral oil, may also be present in the casing if desired, and they may be used in the same manner and amounts as if the tar-depleted liquid smoke treatment had not been used.

In particular, agents for improving the peelability of the casings from food products such as sausages, e.g., frankfurters, bolognas and the like, may be optionally coated on the internal surface of the casings before or after the external application of tar-depleted liquid smoke to the casing and before or during shirring. If the tar-depleted liquid smoke is applied to the casing internal surface, the peelability agent is preferably applied first. Such peelability enhancing agents include, but are not limited to, carboxymethyl cellulose and other water soluble cellulose ethers, the use of which is disclosed in U.S. Pat. No. 3,898,348 issued Aug. 5, 1975 to Chiu et. al., the disclosure of which is incorporated herein by reference; "Aquapel", a Hercules, Inc. trademarked product comprising alkyl ketene dimers, the use of which is further disclosed in U.S. Pat. No. 3,905,397 issued Sept. 16, 1975 to H. S. Chiu, the disclosure of which is incorporated herein by reference; and "Quilon", an E. I. DuPont de Nemours Co., Inc. trademarked product comprising fatty acid chromyl chlorides, the use of which is further disclosed in U.S. Pat. No. 2,901,358 issued Aug. 25, 1959 to W. F. Underwood et al., the disclosure of which is incorporated herein by reference.

The peelability enhancing agent may be applied to the internal surface of the tubular food casings by using any one of a number of well known methods. Thus, for example, the peelability enhancing agent can be introduced into the tubular casing in the form of a slug of liquid, in a manner similar to that disclosed, for example, in U.S. Pat. No. 3,378,379 to Shiner et al. Advancing the casing past the liquid slug coats the inner surface thereof. Alternatively, the peelability enhancing agent may be applied to the internal surface of the casing through a hollow mandrel over which the casing is advancing as, for example, a shirring machine mandrel in a manner similar to that described in U.S. Pat. No. 3,451,827 to Bridgeford.

The method of this invention is also suitable for producing a printed casing, e.g., a casing having an insignia, trademark, lettering, and the like printed thereon, having smoke coloring and smoke flavoring constituent incorporated therein. Exemplary printed casings are disclosed in U.S. Pat. No. 3,316,189, the disclosures of which are incorporated herein by reference.

Casings prepared using the method of this invention are also suitable for the processing of what is conventionally known in the art as "dry sausages." Unlike other types of non-fibrous and fibrous casings which are preferably easy to peel from the food product, either by the food processor before sale to the customer or by the consumer, "dry sausage" casing preferably adheres to the food product during and after processing. "Kymene," a Hercules, Inc. trademarked product which is a polyamide epichlorohydrin resin, the use of which is further disclosed in U.S. Pat. No. 3,378,379 issued Apr. 16, 1968 to Shiner et al., the disclosure of which is incorporated herein by reference, may optionally be internally coated on the internal surface of a casing treated with tar-depleted liquid smoke by the method of this invention, to improve the adhesion of the casing to food products processed therein.

The invention will now be more clearly understood by reference to the following examples which are set forth as being merely illustrative of the invention and which are not intended, in any manner, to be limitative thereof. Unless otherwise indicated, all parts and percentages are by weight and all casing related percentages are based on the total weight of the casing.

EXAMPLE I

This example illustrates the preparation of a tar-depleted liquid smoke composition of this invention by the Solvent Extraction Method. To 0.47 gallons (1.8 liter) of methylene chloride was added 4.7 gallons (1 8 liter) of as-purchased (as-is) liquid smoke solution "A" ("Royal Smoke AA" from Griffith Laboratories, Inc. having an absorptive power of about 0.6 at 340 nm), and the liquids were then thoroughly mixed by repeated inverting of the container. The methylene chloride containing the tars was separated from the liquid smoke by gravity, i.e. the tar-enriched methylene chloride lower layer was drained off until the tar-depleted liquid smoke upper layer appeared as detected by visual observation. The resulting aqueous liquid smoke composition was substantially tar-free as determined by a qualitative water compatibility test in which a sample of the liquid smoke was mixed with water and observed for tar precipitation or lack thereof. The pH of a portion of the aqueous liquid smoke composition was then adjusted to 5.0 by adding a sufficient amount of a 50% NaOH solution to the smoke solution. The pH of a sample of as-is liquid smoke was similarly adjusted to 5.0.

The chemical compositions of the four liquid smoke solutions involved in this Example I are shown in Table B.

TABLE B

Chemical Comparison* of As-Is and Tar-Depleted Liquid Smoke by Solvent Extraction

| Sample No | Sample Description | Phenols mg/g | Carbonyls mg/g | Total Acid Content, % |
|---|---|---|---|---|
| $B_1$ | As-is liquid smoke A (pH 2.4) | 5.2 | 71 | 11.5 |
| $B_2$ | Tar-Depleted liquid smoke composition A (pH 2.4) | 2.3 | 33 | 8.3 |
| $B_3$ | As-is liquid smoke A after neutralization (pH 5.0) | 3.4 | 93 | 10.5 |
| $B_4$ | Tar-depleted liquid smoke composition A after neutralization (pH 5.0) | 2.1 | 15 | 8.8 |

*Numbers are arithmetic averages of multiple determinations.

Table B shows that a tar-depleted aqueous liquid smoke composition of this invention prepared by the Solvent Extraction Method has a substantially different chemical character from the as-is tar-containing aqueous liquid smoke. On a weight basis, the reduced tar compositions of Table B (Samples $B_2$ and $B_4$) have less than about one-half of the phenol content of the tar-containing aqueous liquid smoke solution from which they are derived (Sample $B_1$), and this represents a preferred composition of the invention. While the data in Table B shows that the extraction does substantially alter the total acid level and the carbonyl concentration, other test work indicates that no conclusion can be drawn from our work regarding the effect of extraction upon total acid content or carbonyl concentration. While the tar-depleted liquid smoke of this invention has substantially lower phenolic component concentration than the tar-containing liquid smoke solution from which it is derived, the former's protein staining (color development) ability and or its natural odor or flavor attributes, are not significantly diminished, as demonstrated by ensuing Examples.

It is also apparent from visual inspection of samples of the Table B compositions that those samples embodying this invention contain substantially less high molecular weight tars, since they are noticeably lighter in color. Additionally, they are totally miscible with water.

The procedure for determining total acid content is described hereinafter. The procedures for determining phenol and carbonyl content of liquid smokes is as follows.

Determination of Phenol and Carbonyl Content of Liquid Smoke

For sample preparation, all samples are filtered through Whatman No. 2 filter paper or equivalent, and refrigerated upon receipt or after preparation until the time of analysis to avoid possible polymerization. Distilled water is used for all dilutions. The samples are diluted with water in two steps, beginning with a 10 ml. quantity. In the first step the dilution is to a total volume of 200 ml., and in the second step 10 ml. of the first solution is further diluted to a total volume of 100 ml. For phenol determination, 5 ml. of the second solution is further diluted in a third step with distilled water to a total volume of 100 ml. For carbonyl determination, 1 ml. of the second solution is further diluted with carbonyl-free methanol to a total volume of 10 ml.

For the phenol determination, the reagents are:
1. Boric acid-potassium chloride buffer pH 8.3. Dilute the indicated quantities of the solution to 1 liter with water.
   0.4M boric acid—125 ml.
   0.4M potassium chloride—125 ml.
   0.2M sodium hydroxide—40 ml.
2. 0.6% NaOH.
3. Color reagent:
   N-2,6-trichloro-p-benzoquinoneimine Stock solution: dissolve 0.25 gm. in 30 ml. methanol and keep in refrigerator.
4. 2,6-dimethoxyphenol standards Prepare solutions of 1 to 7 microgram/ml of DMP in water for standard curve.

This procedure for phenol determination is a modified Gibbs method based on the procedure described in Tucker, I. W. "Estimation of Phenols in Meat and Fat", JACAC, XXV, 779 (1942). The reagents are mixed together in the following order:
1st—5 ml. of pH 8.3 buffer.

2nd—5 ml. of dilution of unknown diluted liquid smoke, or of standard 2,6-dimethoxyphenol solution, or 5 ml. of water for blank.

3rd—Adjust pH to 9.8 using 1 ml. of 0.6% NaOH.

4th—Dilute 1 ml. of color reagent stock solution to 15 ml. in water. Add 1 ml. of diluted color reagent. Prepare just before adding.

5th—Allow color to develop for exactly 25 minutes at room temperature.

6th—Determine absorbance at a wave length of 580 nm. in a 1 cm. colorimeter tube with a Spectronic 20 or equivalent.

7th—Prepare a standard curve using absorbance as the abscissa and standard concentrations as the ordinate. Extrapolate concentration of DMP in liquid smoke dilutions from this curve.

8th—Calculate mg DMP/ml liquid smoke using the following equation:

$$\frac{\text{ppm DMP (from std. curve)} \times \text{(dilution factor)} \times 0.001 \text{ mg/}\mu\text{g}}{\text{ml of original liquid smoke sample}} =$$

mg DMP/ml of liquid smoke

To calculate mg DMP/g liquid smoke, divide result of above equation by the weight (g) of 1 ml of liquid smoke.

For carbonyl determination, the reagents are:
1. Carbonyl-free methanol. To 500 ml. of methanol add 5 gm. of 2,4-dinitrophenylhydrazine and a few drops of concentrated HCl. Reflux three hours, then distill.
2. 2,4-dinitrophenylhydrazine solution. Prepare saturated solution in carbonyl-free methanol using twice recrystallized product. Store in refrigerator and prepare fresh every two weeks.
3. KOH solution. 10 gm. in 20 ml. of distilled $H_2O$, diluted to 100 ml. with carbonyl-free methanol.
4. 2-butanone standard. Prepare solutions of 3.0 to 10 mg. of 2-butanone in 100 ml. carbonyl-free methanol for a standard curve.

The procedure is a modified Lappan-Clark method based on the procedure described in their article "Colorimetric Method for Determination of Traces of Carbonyl Compounds", Anal. Chem. 23, 541–542 (1959). The procedure is as follows:

1st—To 25 ml. volumetric flasks containing 1 ml. of 2,4-dinitrophenylhydrazine reagent (prewarmed to insure saturation) add 1 ml. of diluted liquid smoke solution, or 1 ml. of standard butanone solution, or 1 ml. of methanol (for reagent blank).

2nd—Add 0.05 ml. of concentrated HCl to all 25 ml. flasks, mix contents of each, and place in water bath for 30 minutes at 50° C.

3rd—Cool to room temperature and add 5 ml. KOH solution to each.

4th—Dilute contents of each flask to 25 ml. with carbonyl-free methanol.

5th—Read at 480 nm against methanol blank set at absorbance of 0, (cuvettes—0.5×4 (10.1 cm) inches or equivalent). Use Spectronic 20, or equivalent.

6th—Plot absorbance versus 2-butanone (MEK) concentration in mg. per 100 ml. for standard curve.

7th—Prepare a standard curve using absorbance as the abscissa and standard concentrations (mg MEK/100 ml) as the ordinate. Extrapolate concentration of MEK in liquid smoke dilutions from this curve.

8th—Calculate mg MEK/100 ml liquid smoke by the following equation:

$$\frac{\text{mg MEK (from std curve)} \times \text{dilution factor}}{100 \text{ ml}} =$$

mg MEK/100 ml liq smoke

To calculate mg MEK/g liquid smoke, divide the result of the above equation by the weight (in grams) of 100 ml of smoke.

EXAMPLE II

This example illustrates the preparation of a tar-depleted liquid smoke composition of this invention by the Controlled Temperature Neutralization Method. To 110 gallons (980 lbs, 485 liters, 445 kg) of Royal Smoke AA tar-containing as-is liquid smoke solution at a pH of 2.5 and having an absorptive power (hereinafter defined) of about 0.65 at 340 nm. wave length, 73 lbs. (33 kg) of flake NaOH was added at the rate of 2 lbs/minute (0.9 kg/min). The vessel was stirred continuously and cooled with a chilled brine jacket. The temperature varied in the range of 14°–17° C. during the processing. Upon completion of the partial neutralization to a pH of 6.0, the stirring was stopped and the tars were allowed to settle overnight. The tar precipitate and the tar-depleted supernatant liquid were gravity separated and the latter was further filtered through a submicron filter cartridge. The resulting aqueous liquid smoke composition was substantially tar-free as determined by a qualitative water compatibility test in which liquid smoke was mixed with water and observed for tar precipitation or lack thereof. There was no visible precipitation of tar. The chemical compositions of the as-is liquid smoke and tar-depleted liquid smoke of this Example are shown in Table C.

TABLE C

Chemical Comparison* of As-Is and Tar-Depleted Liquid Smoke by Controlled Temperature Neutralization

|  | Phenols mg/g | Carbonyls mg/g | Total Acid Content % |
|---|---|---|---|
| As-is liquid smoke (pH 2.4) | 5.2 | 71 | 11.5 |
| Tar-depleted liquid smoke (pH 6.0) | 3.5 | 120 | 14.5 |

*Numbers are arithmetic averages of multiple determinations.

Table C shows that tar-depleted aqueous liquid smoke composition of this invention prepared by Controlled Temperature Neutralization has a chemical character which is substantially different from the character of the as-purchased tar-containing aqueous liquid smoke. It will be noted that the phenol content is substantially reduced but the carbonyl and total acid content of the tar-depleted liquid smoke is apparently higher than the corresponding values for the original tar-containing liquid smoke. As similarly noted in the discussion regarding Table B, other test work indicates that no conclusion can be drawn from experiments regarding the effect of Controlled Temperature Neutralization upon the total acid content or the carbonyl concentration. A possible explanation is that constituents such as acids, which are highly volatile in the free state (pH of 2) but not volatile in their salt form, may be partially lost in the analytical procedure where sample preparation involves distillation and recovery.

Although in Examples I and II, the tar-depleted liquid smoke was separated from the heavier tar fraction in a single stage by natural gravitation, other separation methods may be employed. For example, in the Solvent Extraction Method, the multi-stage contacting of two liquids may be practiced under ambient temperature and pressure or under elevated temperatures and pressures. Also the natural gravity separation may be accelerated by mechanical means such as liquid-liquid cyclones or centrifugal contactors. Multistage extractions can be undertaken by using a plurality of such devices or by using a vertical countercurrent column. Suitable countercurrent columns include spray towers, packed columns, decked columns containing sieve trays or modified bubble trays, and columns with internal agitation such as rotary disc columns.

EXAMPLE III

This example illustrates the tarring problem when as-is liquid smoke is applied to gel stock tubular food casing, and elimination of the problem by using the tar-depleted liquid smoke solution of this invention.

A non-fibrous frankfurter size cellulosic gel stock casing was taken from the casing manufacturing process at a point prior to the conventional drying step. This wet casing was passed through a dip tank containing an as-is liquid smoke solution (Royal Smoke AA). As the gel-stock casing continued to pass through the dip tank, a dark tarry deposit began to coat out on the casing surface from the as-is smoke solution as the smoke solution migrated into the casing wall. As the run progressed, the tarry deposit began to transfer from the casing surface and accumulate on the carrier rolls and the squeeze rolls of the smoke treatment unit. This tarry deposit was tacky, and eventually the treated casing began to adhere to the rolls, wrap up on the rolls, and break. The run was discontinued.

A new run was begun using the same type of gel stock casing. A partially neutralized mixture was prepared by adding 8 gms of anhydrous sodium carbonate to 100 gms of as-is Royal Smoke AA, without temperature control of the solution. The latter was filtered to remove precipitated tars, and the remaining solution having a pH of 5.6 was a tar-depleted liquid smoke solution of this invention as prepared by the Neutralization Method. This solution was transferred to a dip tank and the non-fibrous gel stock casing was passed therethrough for tar-depleted liquid smoke treatment on its external surface. There was no significant tar formation on either the casing or the rolls.

The smoke treated casing was then passed through a dryer in an inflated state under conditions sufficient to produce a non-fibrous frankfurter casing having a flat width of 1.3 inches (3.3 cm). Samples of casing were then slug-treated in the laboratory with a peeling enhancement solution containing 0.85 percent sodium carboxymethyl cellulose. This internal coating provided 3.5 mg of solution per square inch of casing surface in order to improve the peeling characteristics of the casing.

The casing was then hand stuffed in the laboratory with a protein emulsion. The encased product was processed in a laboratory oven and the casing was therewith peeled off to produce a finished product having a uniform smoke color which did not rub off. No taste test was made.

EXAMPLE IV

This example illustrates the preparation of a tar-depleted smoke treated tubular casing of this invention using liquid smoke prepared by the Solvent Extraction Method as described in Example I. In addition to Royal Smoke AA as the starting mixture, samples were prepared with "Charsol C-10", purchased from Red Arrow Products Co. and having an absorptive power of about 0.4 at 340 nm., the latter being identified in Table D as "as-is" smoke "C" and tar-depleted liquid smoke composition "C".

Several non-fibrous frankfurter size gel stock casings were treated with the neutralized (pH 5.0) aqueous liquid smoke compositions prepared in Example I by applying the liquid smoke solutions to the external surfaces of the casings. The liquid smoke loading was about 10 mg./in.$^2$ (1.55 mg/cm$^2$) of casing surface. The applicator was a device which uniformly distributed the aqueous liquid smoke solution around the casings and comprised two main parts: the liquid smoke applicator and the smoothing unit. The smoke applicator consisted of a stationary foam disc mounted such that liquid smoke entered at the outer edge. Tiny flexible plastic tubes conducted the liquid to the center core where the inflated casing was passed through. The foam disc flexed with casing sizes making it suitable for a range of casing cross-sectional areas. Because the liquid smoke application is not precisely uniform, a rotary smoothing device was used immediately after the applicator. It contained a rotating foam disc with a core size suitable for the casing size being processed. The disc was driven by an air motor at 200 to 250 rpm (1260–1570 min$^{-1}$). Excess liquid smoke from the applicator and from the smoothing device was collected in a common sump and returned to the applicator inlet. The treated casings were moved through a point-support type assembly to and through a drying section. The aforedescribed casing coating and casing movement assembly is not part of the present invention but is claimed in previously referenced copending application Ser. No. 261,457, entitled "Liquid Coating Method and and Apparatus", filed May 7, 1981 in the names of Chiu et al., now U.S. Pat. No. 4,356,218, and incorporated herein to the extent pertinent.

The treated casings were dried at 80° C. to a water content of 12 weight percent. The casings were then conventionally moisturized to 14-18 weight percent water, and shirred. The levels of the smoke compositions, the phenols, carbonyls and total acid content present in the treated casings are shown in Table D.

TABLE D

| Chemical Comparison* of Non-Fibrous Cellulose Casings Treated in Accordance with Invention | | | | |
|---|---|---|---|---|
| Casing Number | Casing Description | Phenols mg/100 cm$^2$ | Carbonyl mg/100 cm$^2$ | Total Acid Content mg/100 cm$^2$ |
| C$_1$ | Treated with smoke Sample B$_3$ | 0.25 | 2.5 | 13.5 |
| C$_2$ | Treated with smoke Sample B$_4$ | 0.08 | 10.5 | 15.2 |
| C$_3$ | Treated with as-is smoke C | 0.20 | 12.2 | 14.1 |

TABLE D-continued

Chemical Comparison* of Non-Fibrous Cellulose Casings Treated in Accordance with Invention

| Casing Number | Casing Description | Phenols mg/100 cm$^2$ | Carbonyl mg/100 cm$^2$ | Total Acid Content mg/100 cm$^2$ |
|---|---|---|---|---|
| | after neutralization (pH 5.0) | | | |
| C$_4$ | Treated with tar-depleted liquid smoke composition C after neutralization (pH 5.0) | 0.05 | 1.2 | 13 |

*Numbers are arithmetic averages of multiple determinations.

One embodiment of the tar-depleted smoke colored and smoke flavored casing of this invention may in part be characterized as a casing having a tar-depleted smoke coating which has less than one-half the phenol content (on the basis of weight per unit area of treated casing surface) that a casing has when coated with the tar-containing aqueous liquid smoke composition from which the tar-depleted liquid smoke was derived. The Table D data are specific examples in which the casing of this invention coated with tar-depleted liquid smoke composition A had only about one-third the phenol content of the casing coated with partially neutralized tar-containing liquid smoke solution A (Royal Smoke AA, comparing casing C$_1$ with casing C$_2$). Similarly, casing coated with tar-depleted liquid smoke composition B had less than about one-fourth the phenol content of the tar-containing liquid smoke solution B (Charsol C-10, comparing casing C$_3$ and casing C$_4$). As in the case of Table B, no conclusion can be drawn with respect to the effect of this invention on the carbonyl content or the total acid content of the casing.

Because of the nature of these experiments, the phenol reduction in the liquid smoke (Table B) and the phenol reduction in the coated casing (Table D) are not proportionate.

EXAMPLE V

This example illustrates the preparation of a tar-depleted liquid smoke treated tubular casing of this invention using liquid smoke prepared by the Controlled Temperature Neutralization Method as described in Example II. For comparison, the same type of casing (non-fibrous cellulose) was treated in the same manner with the as-is tar-containing Royal Smoke AA liquid smoke.

Frankfurter size gel stock casings were treated with the liquid smoke compositions of Example II at a level of about 10 mg/in.$^2$ (1.55 mg/cm$^2$) by application to the external surfaces of the casings. The applicator was the same device described in Example IV.

The treated casings were dried at 80° C. to a water content of 12 weight percent. The casings were then conventionally moisturized to 14-18 weight percent water during shirring. The phenols, carbonyls and total acid present in the treated casings are shown in Table E.

TABLE E

Chemical Comparison* of Casings Based on Controlled Temperature Neutralization

| Casing Number | Casing Description | Phenols mg/100 cm$^2$ | Carbonyl mg/100 cm$^2$ | Total Acid Content mg/100 cm$^2$ |
|---|---|---|---|---|
| E$_1$ | Treated with as-is liquid smoke (pH 2.4) | 0.20 | 9.6 | 7.7 |
| E$_2$ | Treated with tar-depleted liquid smoke (pH 6.0) | 0.15 | 6.4 | 15.8 |

*Numbers are arithmetic averages of multiple determinations.

Because of the nature of these experiments, the phenol reduction in the liquid smoke (Table C) and the phenol reduction in the coated casing (Table E) are not proportionate. As in the case of Table C, no conclusion can be drawn with respect to the effect of this invention on carbonyl content or total acid content of the casing. Relative to the total acid content, the higher level in the partially neutralized and tar-depleted casing sample reflects the lower volatility of the salt form of the acids at higher pH. A possible explanation is that the acid constituents which are highly volatile in the free state (pH of 2), are not as volatile in their salt form (pH of 6), and they may be lost in part while drying the casing treated with as-is liquid smoke.

Objective criteria have been used for comparison of the protein staining (color development) ability of the aqueous liquid smoke composition of this invention with the tar-containing liquid smoke from which it is derived. These criteria include the "Staining Power" as applied to the liquid compositions themselves, and the "Staining Index" as applied to the coating on the tubular food casing. In each instance, the tested embodiments of this invention demonstrated substantial staining ability, yet the tar content had been reduced to a level such that the heretofore experienced tar problems had been eliminated.

The procedure used for measuring staining power and staining index is as follows:

Staining Power and Staining Index Procedure

This procedure has as its basis the reaction encountered in meat processing in which the meat protein reacts with the smoke components, thereby imparting a desirable dark smoked color to the product. To quantify this staining or darkening ability, the unknown smoke or freshly treated smoke-treated casings are reacted with a specific amino acid (glycine) under acidic conditions at 70° C. for thirty minutes. The absorbance of the solution is measured at 525 nm. This procedure can be run on liquid smoke or liquid smoke treated casing with reproducible results. The detailed procedure is as follows:

I. Prepare a 2.5% solution of glycine in 95% acetic acid.
  (a) Dissolve 12.5 g of glycine in 25 ml of water in a 500 ml volumetric flask. Add enough glacial acetic acid to facilitate the dissolution.
  (b) Dilute to the prescribed level with glacial acetic acid.

II. In the case of liquid smoke analysis, weigh into a 15 ml test tube vial, 15–20 mg (±0.1 mg) of the liquid smoke to be evaluated, or III. In the case of smoke-treated casing analysis, punch out four double thickness discs from the test casing to yield a total casing area of 2.0 in$^2$ (12.9 cm$^2$) for the eight discs.
  (a) If the casing is shirred, inflate a section with 10 psi (68,900 Pascals) air to smooth the surface. Collapse the casing by drawing it over a hard surface, punch out the discs and add them to the vial.

IV. To the vials containing either the liquid smoke or the treated casing, add 5.0 ml of the 2.5% glycine/acetic acid solution.

V. Cap the vials, hand shake to assure contact of the sample, and place in a 70° C. oven or constant temperature bath for thirty minutes.

VI. Measure the absorbance at 525 nm for each solution using the glycine reagent as a blank.

VII. The absorbance is reported as the staining power of the liquid smoke or the staining index of the smoke treated casing.

The numerical value for staining index is the absorbance per 2 square inches (12.9 sq. cm) of casing surface.

The staining power represents the ability of a liquid smoke to develop a certain absorbance or color under the staining index procedure, i.e., units absorbance per mg. liquid.

EXAMPLE VI

A series of tests was performed in which as-is tar-containing liquid smoke was partially neutralized from an initial pH of 2.3 to a final pH of 6.0 under controlled temperature conditions (Controlled Temperature Neutralization Method) and also uncontrolled temperature conditions (Neutralization Method). Staining power was determined at different neutralization temperatures and the data are summarized in the FIG. 4 graph for Royal Smoke AA liquid smoke (upper curve) and Charsol C-10 liquid smoke (lower curve).

More particularly, the as-is liquid smoke used for each test was partially neutralized by the addition of 50% NaOH with continuous mixing and cooling by means of an immersed coil-type portable refrigeration unit to remove the heat of solution and maintain the liquid mixture temperature at the desired level. After the required amount of base was added to reach the desired pH of 6.0, the tar precipitate was separated by gravity and the tar-depleted supernatant liquid was used for the staining power measurement.

Figure 4:
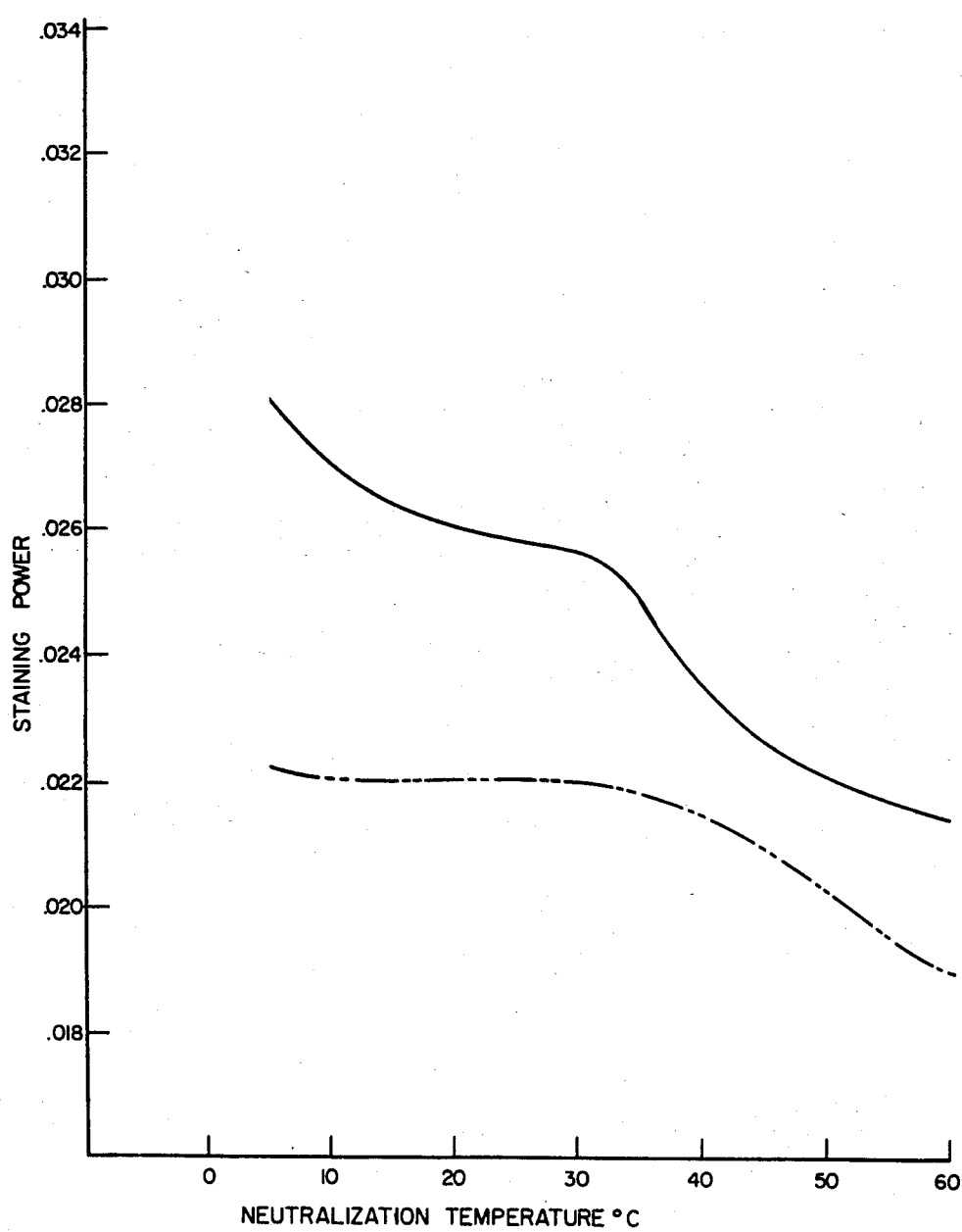
FIG. 4 is a graph showing tar-depleted liquid smoke staining power as a function of partial neutralization temperature.

Inspection of FIG. 4 reveals that the staining power of the partially neutralized Royal Smoke AA remains relatively constant at about 0.027 in the controlled temperature range of 5°–30° C., whereas the Staining Power of the partially neutralized Charsol C-10 liquid smoke remains substantially constant at about 0.022 in the same temperature range. At higher temperatures the staining power begins to diminish. For this particular series of tests and with uncontrolled temperature neutralization (no cooling), the maximum uncontrolled neutralization temperature reached by the liquid smoke mixture was about 60° C. This Example demonstrates that higher staining powers are obtained by preparing the tar-depleted liquid smoke composition of this invention by Controlled Temperature Neutralization rather than by the uncontrolled temperature Neutralization Method.

EXAMPLE VII

A series of ultraviolet absorption spectroscopy tests was performed using tar-depleted liquid smoke treated nonfibrous cellulose food casing according to this invention and tar-containing as-is liquid smoke treated casing. These tests demonstrate the substantial difference between the two types of casings. The tests involved three different types of wood-derived liquid smokes: Charsol C-12, Royal Smoke AA and Royal Smoke B. These tar-containing liquid smokes were applied to the casing external surface in the as-is form at a pH of 2.4 and also after tar removal by the Solvent Extraction (pH 2.4), Neutralization and Controlled Temperature Neutralization Methods (pH 6.0). The casing was a 21 mm. diameter nonfibrous cellulose casing and a coating was sprayed on the casing internal surface for improved peelability. In this and succeeding Examples, the improved peelability solution was the type described in Chiu et al. U.S. Pat. No. 3,898,348. The delivery rate was 3.0–5.0 mg/in$^2$ (0.47–0.78 mg/cm$^2$) of casing surface and the range of compositions used in this solution is listed in Table F.

TABLE F

| Improved Peelability Solutions | |
|---|---|
| | Wt. % |
| Carboxymethyl Cellulose (Sodium Salt) (Hercules "CMC 7LF") | 0.8–1.0 |
| Water | 40.0–45.0 |
| Propylene Glycol | 45.0–50.0 |
| Mineral Oil | 5.0–10.0 |
| Polyoxyethylene sorbitan ester of higher fatty acids ("Tween 80") | 0.5–1.25 |

The procedures used for preparing the tar-depleted liquid smokes were the same as described in previous examples. These tar-depleted liquid smokes and the as-is tar-containing liquid smokes were each applied to the casing exterior surfaces in the same manner described in previous examples, and to a loading level of about 10 mg/in$^2$ (1.55 mg/cm$^2$) casing surface.

The ultraviolet absorption spectrum over the 350 to 210 nm. range was recorded for liquid samples obtained from various smoke treated casings by way of the following procedure:
  (a) A 0.0635 m$^2$ sample of liquid smoke treated casing was submerged in 200 ml of anhydrous methanol for a period of about 1 hour and then removed.
  (b) Depending on the liquid smoke loading, further dilution must be made for compatibility with the UV scanning equipment. In these instances the liquid smoke loading was about 10 mg/in$^2$ (1.55 mg/cm$^2$) of casing and the solution used for scanning comprised 4.96 ml. of methanol and 0.10 ml. of the extract from step (a).
  (c) The UV spectrum was recorded in the 350 to 210 nm. range with the following format: 2 second response/2 mm slit, 10 nm./cm. chart, 50 nm/minute scan speed, and 0–200%.

In order to measure the absorbance primarily due to tars present in the liquid smoke, the spectrophotometer was zeroed using an extract solution containing the lowest possible tar content. For any particular type of liquid smoke, this was an extracted and neutralized (pH 5.0) smoke treated casing extract sample. Once zeroed in this manner, any additional absorbance in the UV spectrum was a quantitative measure of the tarry components present.

Figure 5:
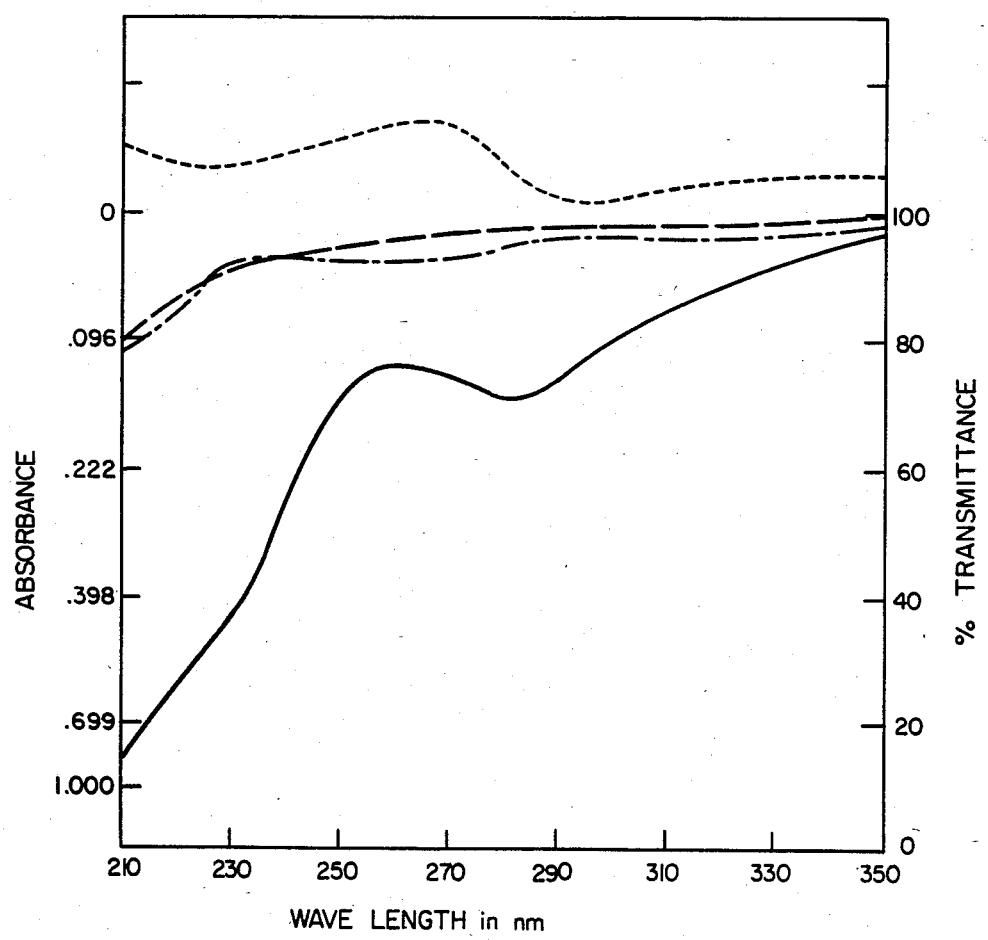
FIG. 5 is a graph showing ultraviolet absorbance and ultraviolet transmittance at various wave lengths for both as-purchased ("as-is") "Charsol C-12" liquid smoke and the inventive tar-depleted liquid smoke derived therefrom.

The results of these ultraviolet absorption tests for Charsol C-12 are plotted in the FIG. 5 graph with the as-is liquid smoke shown as a solid line. The tar-depleted liquid smoke prepared by the Neutralization Method is shown as a dash line, the tar-depleted liquid smoke prepared by the Controlled Temperature Neutralization Method is shown as a dash-dot-dash line, and the tar-depleted liquid smoke prepared by the Solvent Extraction Method is shown as a dotted line. The results of the ultraviolet absorption tests for as-is Royal Smoke AA and as-is Royal Smoke B liquid smokes, and for the tar-depleted liquid smokes derived therefrom, are similarly presented in the FIGS. 6 and 7 graphs, respectively. The greater than zero transmittance recorded in the graphs of FIGS. 5-7 is a function of the machine blank used in these particular experiments.

Figure 6:
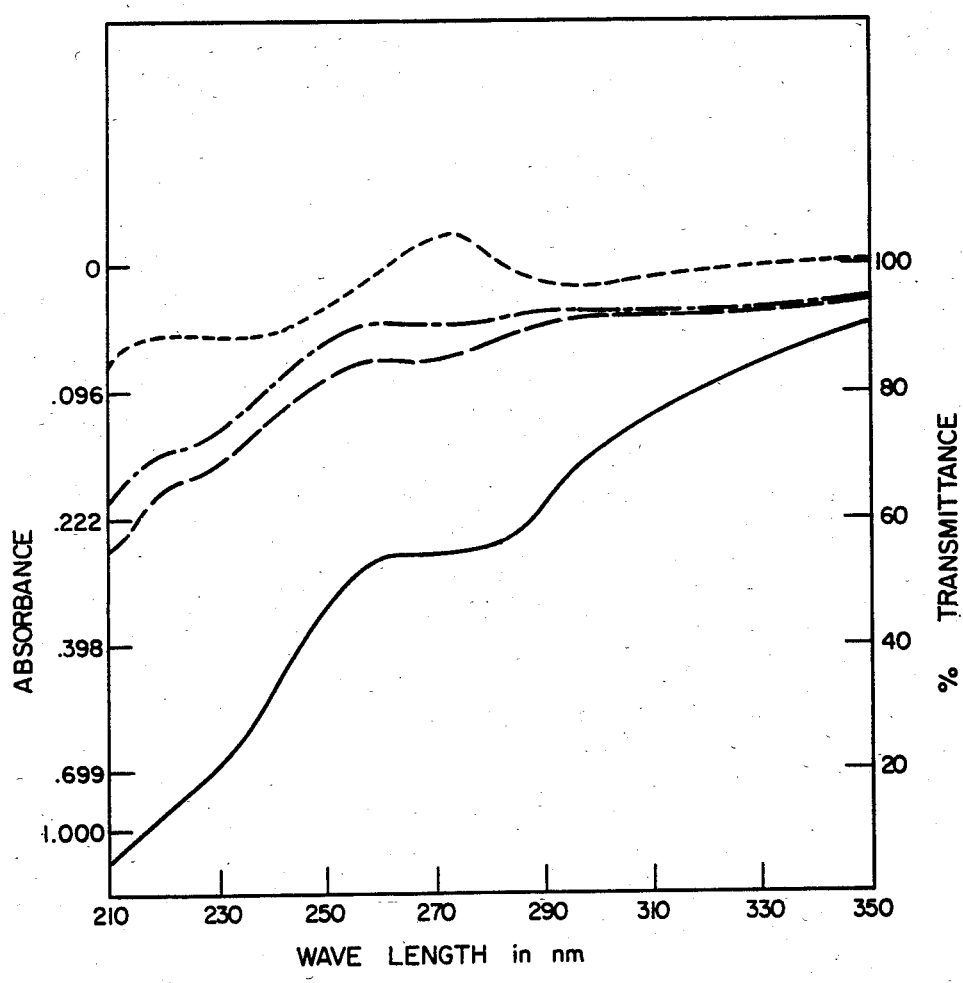
FIG. 6 is a graph showing ultraviolet absorbance and ultraviolet transmittance at various wave lengths for both as-is "Royal Smoke AA" liquid smoke and the inventive tar-depleted liquid smoke derived therefrom.
Figure 7:
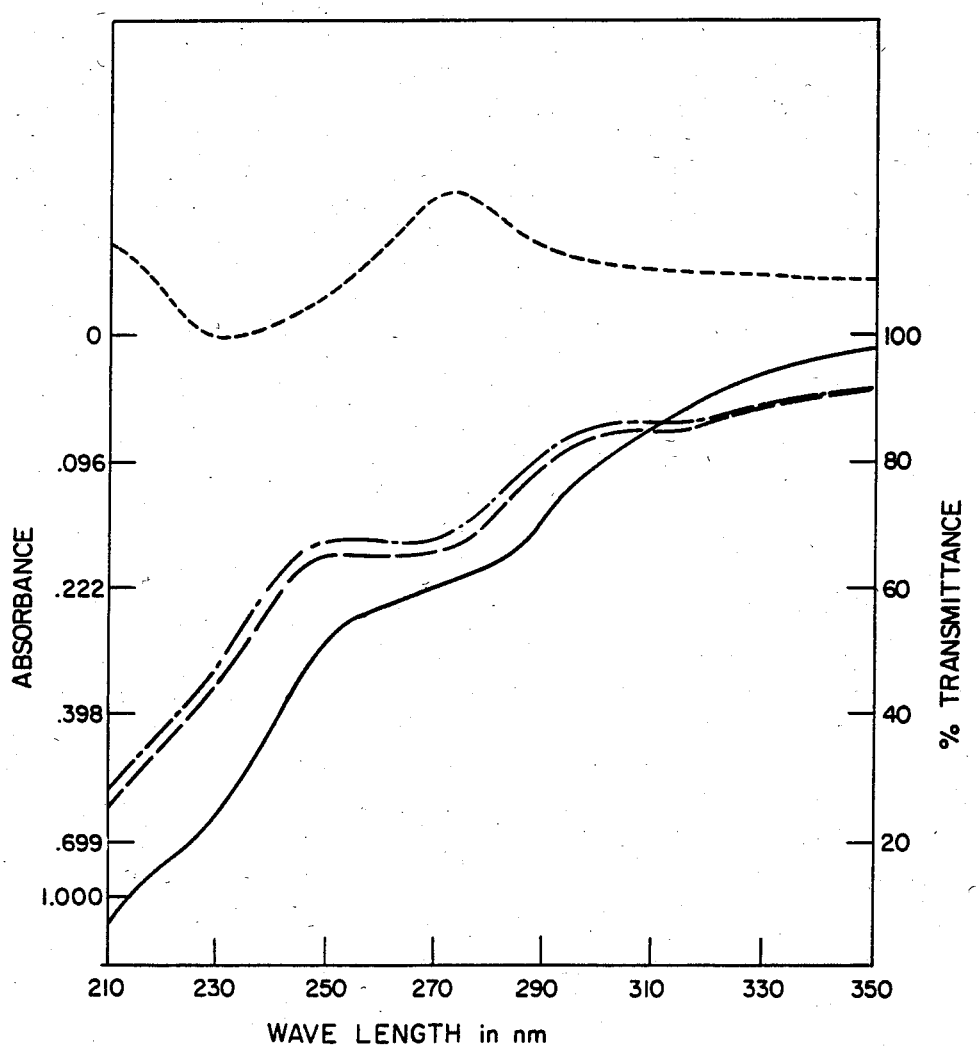
FIG. 7 is a graph showing ultraviolet absorbance and ultraviolet transmittance at various wave lengths for both as is "Royal Smoke B" liquid smoke and the inventive tar-depleted liquid smoke derived therefrom.

Inspection of the curves of FIGS. 5-7 reveals that the greatest difference between the tar-depleted samples and tar-containing samples occurs at about 210 nm. wave length, although there is a substantial difference over the entire scanned range of wave lengths. The difference is greatest with liquid smokes of highest total acidity and highest tar content (Charsol C-12 and Royal Smoke AA). The absorbance difference is less with Royal Smoke B having lower total acidity and lower tar content when treated by the Controlled Temperature Neutralization and Neutralization methods.

The absorbance and percent light transmittance values at 210 nm. wave length are summarized in Table G, and can be used to show that the smoke extracts from the tar-depleted liquid smoke treated cellulose casings of this invention have an absorbance at 210 nm. wave length which is no more than about 60%, and preferably no more than about 30%, of the ultraviolet absorbance of the smoke extract from a corresponding tar-containing liquid smoke treated casing having the same absorptive index (hereinafter defined). Table G also shows that the ultraviolet light transmittances for the tar-depleted liquid smoke treated cellulose casings of this invention at 210 nm. wave length are at least four times the ultraviolet light transmittance of an identical casing treated with the tar-containing liquid smoke from which the tar-depleted liquid smoke was derived.

TABLE G

Ultraviolet Comparisons at 210 nm. Wave Length For Smoke Extracts From Smoke-Treated Casings

| Type of Liquid Smoke and Tar Removal | Transmittance % | Absorbance | Absorbance % of As-Is Smoke |
|---|---|---|---|
| Charsol C-12 | | | |
| Solvent Extraction | About 100 | 0 | 0 |
| Neutralization | 78 | 0.108 | 13 |
| Contr. Temp. Neutralization | 80 | 0.097 | 11 |
| As-is | 14 | 0.854 | — |
| Royal Smoke AA | | | |
| Solvent Extraction | 86 | 0.066 | 5 |
| Neutralization | 56 | 0.252 | 21 |
| Contr. Temp. Neutralization | 62 | 0.208 | 17 |
| As-is | 6 | 1.222 | — |
| Royal Smoke B | | | |
| Solvent Extraction | About 100 | 0 | 0 |
| Neutralization | 26 | 0.585 | 48 |

TABLE G-continued

Ultraviolet Comparisons at 210 nm. Wave Length For Smoke Extracts From Smoke-Treated Casings

| Type of Liquid Smoke and Tar Removal | Transmittance % | Absorbance | Absorbance % of As-Is Smoke |
|---|---|---|---|
| Contr. Temp. Neutralization | 27 | 0.569 | 47 |
| As-is | 6 | 1.222 | — |

EXAMPLE VIII

The nonfibrous gel stock cellulosic casing embodiment of this invention preferably has a tar-depleted liquid smoke coating which results in a casing haze value which is no more than 80% of the haze value, and most preferably no more than 70% of the casing haze value, which an identical casing has with a coating of the tar-containing liquid smoke from which the tar-depleted liquid smoke is derived. The tar-containing liquid smoke has a total acid content of at least about 10 wt. %.

Haze value represents a measure of the tar content in the casing, and this casing characteristic was demonstrated in a series of experiments involving haze determination for nonfibrous gel stock cellulose casings having no liquid smoke treatment, having treatment with as-is tar-containing liquid smoke, and having treatment with tar-depleted liquid smoke. In each instance, the as-is tar-containing liquid smoke was Royal Smoke AA, having a total acid content of 11.5-12.0 wt. % (Table A). The general procedure was to immerse the casing sample in water, and during this soaking period any tar components incorporated in the casing wall are insolubilized by the water. To the extent that tar is present, water incompatibility is quantitatively measured in the form of a cloudy haze in the casing.

In the experiments, the tar-depleted liquid smoke prepared by the Solvent Extraction Method was first contacted with methylene chloride liquid solvent in a volume ratio of 10:1 liquid smoke solution to liquid solvent. After mixing, the solution was allowed to stand for a period of 12 to 16 hours to form the two layers, and the separated tar-depleted liquid smoke upper layer was partially neutralized to a pH of 5.0 and incorporated on the cellulose casing external surface by the Example IV procedure. For all of the liquid smoke treatments in this Example VIII, the liquid smoke was incorporated into the casing external surface at a loading of about 10 mg/in$^2$ (1.55 mg/cm$^2$) of casing surface.

The tar-depleted liquid smoke prepared by the Neutralization Method was partially neutralized by the addition of NaOH, without temperature control, to the as-is liquid smoke to achieve a pH of 5.5, and the tar-depleted portion was separated by decanting. This tar-depleted liquid smoke was incorporated in the casing wall by application of aqueous liquid smoke to the external surface of gel stock casing.

The tar-depleted liquid smoke prepared by the Controlled Temperature Neutralization Method was neutralized to a pH of 6.0 at 10°-15° C. in the Example II manner. The tar-depleted liquid smoke was separated from the tar precipitate and incorporated in the casing external surface by the Example IV procedure.

For all of the casings used in this Example VIII, the improved peelability solution of Table F. was sprayed on the casing inner surface. The 21 mm. diameter nonfibrous casings were shirred and 36 inch (91.4 cm) long samples were taken randomly from a deshirred stick, inflated with air to minimize shirring wrinkles, and immersed in 200 ml. of deionized water. Immersion time was at least one hour but not more than three hours, i.e., only sufficient duration for complete penetration of the casing wall by the water. After blotting the samples dry, casing haze was measured using the general procedure outlined in ASTM Method D 1003, Volume 35, "Haze and Luminous Transmittance of Transparent Plastics" (1977). The results of these tests are summarized in Table H as follows:

TABLE H

| Type Smoke Preparation | Casing Haze | | Ave. Haze % |
|---|---|---|---|
| | No. Determinations | Haze Range % | |
| No smoke | 32 | 6.0–9.7 | 7.9 |
| Neutralization | 33 | 6.1–9.5 | 7.6 |
| Controlled Temp. Neut. | 32 | 5.9–8.5 | 6.7 |
| Solvent Extraction | 28 | 5.4–8.7 | 6.6 |
| As-Is | 32 | 8.5–13.1 | 10.7 |

Table H shows that the tar-depleted liquid smoke treated casing of this invention (prepared from Royal Smoke AA liquid smoke) has haze values of (7.6, 6.7 and 6.6%) which are no more and actually less than the haze value for an identical casing without the liquid smoke coating (7.9%).

The average haze value for various manufacturers' casings may vary somewhat, although most casings (without liquid smoke treatment) are in the range of 7.7–8.2%. However, the average haze value for the untreated cellulose tubular casing of one manufacturer is much higher, i.e., about 21.9%.

It will be recalled that the haze value approach to characterizing tar-depleted liquid smoke treated casings of this invention is limited to casings which are smoke treated in the gel stock state. With this type of casing the liquid smoke actually penetrates the casing wall and any tar components are irsolubilized by water during subsequent soaking. With liquid smoke treated dry stock casing the liquid smoke apparently does not penetrate the casing outer surface and is washed off during the water soaking step of the haze value measurement. Accordingly, haze value is not useful in characterizing the tar-depleted liquid smoke treated dry stock casings of this invention. By way of illustration, there is no difference in haze value between tar-containing and tar-depleted Royal Smoke AA liquid smoke treated dry stock casing at smoke loading of about 10 mg/in$^2$ (1.55 mg/cm$^2$) casing surface.

The haze value characterization of the tar-depleted liquid smoke treated gel stock casings also requires use of liquid smokes having total acid content of at least about 10 weight %. Liquid smokes of lower acid content apparently do not contain sufficient tar to provide a measureable difference in haze value between tar-containing and tar-depleted liquid smoke coated casings. This was illustrated by tests involving casing treatment with as-is tar-containing and tar-depleted Royal Smoke B liquid smoke applied to a loading of about 14 mg/in$^2$ (2.17 mg/cm$^2$) casing surface. Royal Smoke B has a total acid content of about 8.5–9.0 wt. % (see Table A), and there was no detectable difference in haze vlaue for the two types of casings.

It is apparent from Table H that the average haze for the as-is tar-containing liquid smoke treated cellulose casing is substantially higher than the average haze for the tar-depleted liquid smoke treated cellulose casing of this invention. The highest average haze of the three types of tested tar-depleted liquid smoke treated casings (7.6%) is 71% of the average haze for the as-is tar-containing liquid smoke treated casings, thereby providing an upper limit of less than about 80% for the preferred tar-depleted liquid smoke treated nonfibrous casing of this invention. The other two types of casings have average hazes which are 62% of the as-is liquid smoke treated casing average haze, thereby illustrating the most preferred upper limit of less than about 70%. Since the haze value varies somewhat from sample to sample, it should be understood that the haze requirements for the casing of this invention are based on the arithmetic average of at least ten samples.

Average haze values are also a function of casing diameter and increase with increasing diameter because of the thicker casing wall. The absolute value for average haze further depends on the total acid content (and absorptive power as hereinafter discussed) of the particular smoke and the amount of smoke incorporated in the casing. However, in general, the average haze for the cellulose casings of this invention is substantially lower than the average haze for cellulose casings treated with as-is liquid smoke even though their smoke coloring and smoke flavor-developing capabilities in encased foodstuff products are about the same when prepared under equivalent conditions. This relationship demonstrates the chemical and functional difference between the tar-depleted liquid smoke-treated cellulose casings of this invention and as-is liquid smoke treated casing.

The haze test is only useful in characterizing the cellulose casings and not the fibrous casings of this invention. This is because fibrous casings are inherently opaque and have a very high average haze, e.g., about 97.5% for untreated fibrous casings of about 70 mm. diameter.

EXAMPLE IX

The external surfaces of 21 mm. diameter cellulose frankfurter casings were treated with the tar-depleted liquid smoke composition prepared by the Controlled Temperature Neutralization Method in the manner of Example II and using the Example V treatment procedure. For purposes of comparison, the same size casings untreated by liquid smoke solution were used with and without the aforedescribed Table F enhanced peelability solution spray-coated on the inner surface of these control casings. All casings were stuffed with either an emulsion of the beef meat formulation of Table I or the high collagen meat formulation of Table J.

TABLE I

| Beef Formulation | |
|---|---|
| Ingredients | Weight (kg) |
| Beef Chuck | 22.68 |
| Beef Plate | 22.68 |
| Salt | 1.13 |
| Water | 13.61 |
| Seasoning | 0.45 |
| Sodium Nitrite (Prague Powder) | 0.11 |

TABLE J

| High Collagen Formulation | |
|---|---|
| Ingredients | Weight (kg) |
| Beef Chuck | 9.98 |
| Beef Tripe | 7.26 |
| Beef Shank | 7.26 |
| Beef Cheek | 7.26 |
| Regular Pork | 13.61 |
| Water | 9.98 |
| Salt | 1.13 |
| Seasoning | 0.45 |
| Sodium Nitrite (Prague Powder) | 0.11 |

The stuffed casings were processed under normal thermal conditions as commercially practiced, and then mechanically peeled with commercial-type equipment. Two processing chambers were used for the two types of emulsions but they were programmed in the same manner to raise the temperature from 140° to 180° F. over a one-half hour period with 10% relative humidity. The meat product was cooked to an internal temperature of 155° F. (68° C.), and then cold water showered (47° F., 8° C.) for 10 minutes followed by a ten minute chilled water shower (35° F., 1.6° C.). Processing conditions were sufficient to cause the transfer of smoke color, odor and flavor constituents from the casing to the encased frankfurters. Promptly after this processing, colorimetric values were obtained using a Gardner XL-23 Colorimeter with a 1 cm aperture opening standardized with a white plate, all in accordance with the standard operating procedures described in the instruction manual for the Gardner XL-23 Tristimulus Colorimeter, which is commonly used in industry for the measurement of color and light intensity. Three locations on each of ten frankfurters from each treatment were selected for readings. Reading locations were approximately 1 inch (2.54 cm) from each frankfurter end and in the middle. Colorimetric "L" and "a" values were collected. The results of these peelability and colorimetric tests are summarized in Tables K and L.

TABLE K

| | Peelability Tests | | | |
|---|---|---|---|---|
| Sample No. and Description No. | No. Franks No. Peeled | No. Franks Unpeeled | Peelability | |
| $K_1$ Untreated control[1] | 104 | 19 | 85 | 18 |
| $K_2$ Untreated control with enhanced peelability[1] | 112 | 112 | 0 | 100 |
| $K_3$ Tar-depleted sample with enhanced peelability[1] | 256 | 253 | 3 | 99 |
| $K_4$ Untreated control[2] | 96 | 12 | 84 | 13 |
| $K_5$ Untreated control with enhanced peelability[2] | 128 | 128 | 0 | 100 |
| $K_6$ Tar-depleted sample with enhanced peelability[2] | 128 | 120 | 8 | 94 |

[1]Beef formulation.
[2]High collagen meat formulation.

TABLE L

| | Colorimetric Tests | | | | |
|---|---|---|---|---|---|
| | Colorimetric Values | | | | |
| Samples | L* | % L | Std. Dev. | a** | % a | Std. Dev. |
| $K_2$ | 46.46 | — | 0.77 | 16.23 | — | 0.39 |
| $K_3$ | 44.51 | −1.95 | 0.97 | 16.44 | +0.21 | 0.46 |
| $K_5$ | 51.88 | — | 0.87 | 13.04 | — | 0.37 |
| $K_6$ | 48.94 | −2.94 | 1.33 | 14.07 | +1.03 | 0.63 |

*"L" values represent light vs. darkness: the lower the value, the more dark the sample.
**"a" values represent redness: the higher the value, the more red the sample.

Analysis of Table K indicates that peelability of the beef formulation sample based on use of the tar-depleted liquid smoke and treated cellulose casing of this invention (sample $K_3$) was excellent with use of the enhanced peelability solution. Peelability of the high collagen meat formulation sample (Sample $K_6$) was good with use of the internally applied enhanced peelability solution. Analysis of Table L indicates that the frankfurter products made in tar-depleted liquid smoke treated samples showed a darker and more red color than frankfurter products made in casings which were untreated by liquid smoke solution.

EXAMPLE X

Several non-fibrous frankfurter size cellulose casings were treated as in Example IV (Royal Smoke AA - derived solutions and methylene chloride extraction of tars), except that the improved peelability solution of Table F was thereafter spray coated on the interior surface of the casing during shirring at a delivery rate of 3.5 mg/in$^2$ (0.54 mg/cm$^2$) of casing surface to improve the peelability characteristics of the casings. The pH of the aqueous liquid smoke compositions (liquid smoke compositions $B_1$ and $B_2$ of Example I) used in these experiments was adjusted by the addition of a 50% NaOH solution to achieve a pH of 3.2 or greater as shown in Table M.

TABLE M

| pH Adjustment of Solvent Extracted Liquid Smokes | |
|---|---|
| Sample No. | Solution pH |
| CMC - 8 | Untreated control |
| CMC - 9 | Sample $B_2$ (pH 2.4) |
| CMC - 10 | 3.2 |
| CMC - 11 | 4.1 |
| CMC - 12 | 5.0 |
| CMC - 15 | 5.1 |
| CMC - 13 | 6.1 |
| CMC - 14 | 7.0 |

Casings treated with the tar-depleted liquid smoke of Table M were stuffed with a high collagen-content meat emulsion having the formulation of Table N.

TABLE N

| Frankfurter Formulation | |
|---|---|
| Ingredients | Weight (kg) |
| Beef Chuck | 9.98 |
| Beef Tripe | 7.26 |
| Beef Shank | 7.26 |
| Beef Cheek | 7.26 |
| Regular Pork | 13.61 |
| Water | 9.98 |
| Salt | 1.13 |
| Seasoning | 0.45 |
| Sodium Nitrite (Prague Powder) | 0.11 |

The stuffed casings were then processed by the conventional steps of cooking, cold water showering and chilling, but without the conventional step of smoke treatment. The casings were peeled from the finished frankfurters on a High Speed Apollo Ranger Peeling Machine, and Table O shows that these casings peeled 100% where the pH was at least 4.1. This means that all frankfurters were separated from their casing at machine peeling speed without mechanical jamming of the peeling machine and without scarring of the frankfurter surface. Colorimetric values were also obtained using the apparatus described in Example IX. Table O also shows that each of the samples had generally superior colorimetric values as compared with the control sample CMC-8. All samples showed superior darkness (the "L" value), but Sample CMC 14 had lower redness (the "a" value) due to a relatively high solution pH of 7.0.

and its corresponding tar-depleted liquid smoke, neutralized at various temperatures in the same temperature range were used and also aged at 100° F. (37.8° C.) for periods of up to 25 days. In a third series of tests, as-is Charsol C-10 and its corresponding tar-depleted liquid smoke were also neutralized at various temperatures in the 5°–30° C. range and aged at 70° C. for periods of up to 22 days. In a fourth series of tests, as-is Royal Smoke AA liquid smoke and its corresponding tar-depleted liquid smoke were neutralized at various temperatures in the 5°–30° C. range and aged at 70° C. for periods of up to 25 days. The procedure (Controlled Temperature Neutralization) for preparing the tar-depleted liquid smoke in these tests was the same as described in Example II, and the results of these tests are summarized in Table P.

TABLE P

Effect of Elevated Temperature Aging on Staining Power

| Type Smoke | Aging Temperature | Staining Power | | | | | |
|---|---|---|---|---|---|---|---|
| | | Original | 5 days | 10 days | 15 days | 20 days | 25 days |
| As-is Royal Smoke AA | 37.8° C. | 0.032 | 0.032 | 0.032 | 0.032 | 0.032 | 0.032 |
| Royal Smoke AA neutralized at 5–30° C.* | 37.8° C. | 0.026 | 0.022 | 0.019 | 0.015 | 0.012 | 0.009 |
| As-is Charsol C-10 | 37.8° C. | 0.025 | 0.025 | 0.025 | 0.025 | 0.025 | 0.025 |
| Charsol C-10 neutralized at 5–30° C.* | 37.8° C. | 0.020 | 0.018 | 0.016 | 0.013 | 0.011 | 0.008 |
| As-is Royal Smoke AA | 21.1° C. | 0.034 | 0.033 | 0.034 | 0.034 | 0.030 | 0.034 |
| Royal Smoke AA neutralized at 5–30° C.* | 21.1° C. | 0.027 | 0.024 | — | 0.026 | 0.022 | 0.022 |
| As-is Charsol C-10 | 21.1° C. | 0.024 | 0.024 | 0.024 | 0.024 | 0.024 | 0.024 |
| Charsol C-10 5–30° C.* | 21.1° C. | 0.022 | 0.021 | 0.020 | 0.018 | 0.017 | — |

*Average values for temperatures of 5, 10, 15, 20 and 30° C.

TABLE O

Colorimetric Values and Peelability

| | Colorimetric Values | | | | Peelability | | | |
|---|---|---|---|---|---|---|---|---|
| Sample | L | Std. Dev. | a | Std. Dev. | Total No. Franks | No. Franks Peeled | No. Franks Unpeeled | % Peelability |
| CMC-8 | 47.14 | 1.02 | 14.79 | .48 | 64 | 64 | 0 | 100 |
| CMC-9 | 45.29 | 0.74 | 15.68 | .34 | 96 | 0 | 96 | 0 |
| CMC-10 | 45.32 | 0.73 | 15.84 | .41 | 112 | 4 | 108 | 4 |
| CMC-11 | 46.26 | 1.12 | 15.17 | .34 | 96 | 96 | 0 | 100 |
| CMC-12 | 44.55 | 1.02 | 15.29 | .32 | 104 | 104 | 0 | 100 |
| CMC-13 | 46.02 | 1.11 | 15.14 | .37 | 120 | 120 | 0 | 100 |
| CMC-14 | 44.68 | 1.03 | 14.59 | .59 | 112 | 112 | 0 | 100 |
| CMC-15 | 45.67 | 1.10 | 16.04 | .30 | 112 | 112 | 0 | 100 |

Note 1. Colorimetric values represent 3 measurements for each frank (beginning, middle, and end) and 10 franks per sample.
Note 2. L values represent light vs. darkness. The lower the value the more dark the sample.
Note 3. a values represent redness. The higher the values the more red the sample.

Frankfurters processed in the casings of this Example X have demonstrated an acceptable smoke flavor.

EXAMPLE XI

Staining powers were measured for various compositions which were aged at elevated temperatures (relative to the controlled neutralization temperature during preparation) for periods up to 25 days. In a first series of tests, as-is Royal Smoke AA liquid smoke and its corresponding tar-depleted liquid smoke, neutralized to a pH of 6.0 at various temperatures in the 5°–30° C. range, were used and aged at 100° F. (37.8° C.) for periods of up to 25 days. In a second test series, as-is Charsol C-10

Table P shows that the staining powers of as-is tar-containing liquid smokes are substantially constant, i.e., unaffected by elevated temperature aging. In contrast, the staining powers of the tar-depleted liquid smokes of this invention continuously decline during elevated temperature aging at 70° F. (21.1° C.) and 100° F. (37.8° C.) over periods of up to at least 25 days. This decline is at an approximately constant and linear rate, within the entire neutralization temperature range of 5°–30° C. Although these aging tests employed samples prepared by Controlled Temperature Neutralization, other aging tests with tar-depleted liquid smokes prepared by (uncontrolled temperature) Neutralization and Solvent Extraction demonstrate the same phenomenon. These tests demonstrate the chemical difference between tar-containing liquid smokes and the tar-depleted liquid smokes of this invention.

EXAMPLE XII

A series of tests was performed on aged casings of this invention which demonstrates that even though the staining index of the tar-depleted liquid smoke treated casings declines significantly from the indices of freshly prepared casings, surprisingly, the stuffed food product made by using the aged casings has smoke color equivalent in colorimeter value to product produced with fresh casing.

These aging tests included casings treated with as-is tar-containing liquid smoke under substantially identical conditions, and the staining index did not decline for such casings nearly to the extent that the staining index declined for the tar-depleted liquid smoke treated casings of this invention. This comparison demonstrates the chemical difference between the two types of casings.

In these tests, Royal Smoke AA was applied to the external surface of a 21 mm. diameter cellulose casing having a CMC-based coating on the internal surface for improved peelability. For the samples based on this invention, the as-is liquid smoke was first contacted with methylene chloride liquid solvent in a volume ratio of 10:1 liquid smoke solution to liquid solvent. After mixing, the solution was allowed to stand for a period of 12 to 14 hours to form the two layers. The separated tar-depleted liquid smoke upper layer was partially neutralized to a pH of 5 and incorporated on the cellulose casing external surface by the Example IV procedure. Half of the casings were stuffed with a high collagen-content frankfurter meat emulsion very similar to the Table E formulation, and processed by the conventional steps of cooking, cold water showering and chilling, but without conventional smoke treatment. The other half of the casings was aged as set forth in Table Q, and then they were used to produce frankfurters in the same manner. The results of these tests are summarized in Table Q. The colorimetric values were obtained with the same equipment used in Example III and by the same procedure described in connection therewith.

It should be understood that the Table Q data should not be compared quantitatively, because the initial staining indices ("Fresh S.I.") are different and different aging conditions were used. However, the data does qualitatively support the general relationship that stuffed food product made by using aged casings has smoke color which is unaffected by the casing age, notwithstanding the fact that the staining index of the casing declines with age.

EXAMPLE XIII

All of the previously described tubular food casing treatment experiments involved cellulosic non-fibrous casings, but the invention is also useful in treatment of cellulosic fibrous casings. In this experiment fibrous casing stock of about 6.3 in (16. cm) flat width was treated with tar-depleted liquid smoke prepared from Royal Smoke AA as-is liquid smoke solution by the Controlled Temperature Neutralization Method outlined in Example II. The untreated cellulosic fibrous casing reel stock was unwound and caused to move through a bath of the tar-depleted liquid smoke solution making only one dip, and immediately rewound to form another reel. This procedure allowed the excess solution applied to the casing exterior surface to be absorbed from the casing exterior surface and penetrate the casing wall while on the reel to provide the final treated casing. The dipping operation was conducted in a manner such that the casing interior surface was not in contact with the tar-depleted liquid smoke solution. Dwell-time in the solution was only a fraction of a second and the casing travel speed from reel-to-reel was about 107 m/min (350 ft/min). The reel-applied casing tension was about 44 Newtons (10 lbs). The estimated tar-depleted liquid smoke solution loading on the casing was about 3.7 mg/cm$^2$ (24 mg/in$^2$) in. of casing surface. This particular method for manufacturing a liquid smoke-treated fibrous casing is not part of the present invention but is claimed in copending application Ser. No. 301,276 entitled "Liquid Smoke Impregnation of Fibrous Food Casings", filed Sept. 11, 1981 in the name of H. S. Chiu, now U.S. Pat. No. 4,377,606.

The so-treated fibrous casing stock was then conventionally shirred in a manner well known to those skilled in the art, and separate casing samples were then stuffed with ham and bologna and processed using conventional stuffing and processing methods, except that no smoke was applied in the smokehouse. The ham and bologna products had acceptable color, odor and flavor, which was imparted thereto by the smoke treated casings of this invention.

EXAMPLE XIV

This experiment demonstrates preparation of tar-depleted liquid smoke treated fibrous casing in which the treating liquid was prepared from tar-containing liquid smoke by the Solvent Extraction Method.

The tar-depleted liquid smoke was prepared by contacting as-is Royal Smoke AA with methylene chloride in the manner of Example I, but without pH adjustment. The residual methylene chloride was removed from the tar-depleted fraction by applying sub-atmospheric pressure to the container holding the liquid. This tar-dep-

TABLE Q

| Type Casing Treatment | Smoke Loading mg/sq. cm. | Casing Fresh S.I. | $\Delta L^{}$ of Frankfurter From Fresh Casing | Type Aging | Casing Aged S.I. | $\Delta L^{}$ of Frankfurter From Aged Casing |
|---|---|---|---|---|---|---|
| Tar-Depleted Liquid Smoke | 1.63 | 0.62 | −2.87 | Accel.* | 0.32 | −3.36 |
| Tar-Containing Liquid Smoke | 1.58 | 0.42 | −5.21 | 3 months at 40° C. | 0.36 | −3.89 |

*Accelerated aging was at 50° C. for 72 hours.
**L values are frankfurter colorimetric measurements and $\Delta L$ is the difference (darker color) compared to a frankfurter sample not treated with liquid smoke.

leted liquid smoke was used to prepare a treated fibrous casing using the same fibrous casing and the same procedure as described in Example XIII. The so-treated fibrous casing stock was then shirred in a manner well known to those skilled in the art, and separate casing samples were then stuffed with ham and bologna and processed using conventional stuffing and processing methods, except that no smoke was applied in the smokehouse. The ham and bologna products had acceptable color, odor and flavor.

In a preferred embodiment, the tar-depleted liquid smoke composition is prepared from tar-containing aqueous liquid wood smoke solution having a total acid content of at least about 7 weight percent, and most preferably a total acid content of at least about 9 weight percent. Total acid content is a qualitative measure of the tar content and staining power (previously defined) of as-is liquid wood smokes used by manufacturers. In general, higher total acid content means higher tar content. The same is true of the total solids content of as-is liquid smoke. The procedures used by liquid wood smoke manufacturers to determine total acid content (total acidity) and total solids are as follows:

Determination of Total Acid Content for Tar-Containing Liquid Smoke

1. Weigh accurately about 1 ml. of liquid smoke (filtered if necessary) in a 250 ml. beaker.
2. Dilute with about 100 ml. of distilled water and titrate with standard 0.1N NaOH to a pH of 8.15 (pH meter).
3. Calculate the total acid content as percent by weight of acetic acid, using the following conversion;

1 ml. 0.1000 N NaOH = 6.0 mg. HAc

As will be discussed hereinafter, this dilution-titration procedure is also used for measuring the total acid content of tar-depleted liquid smoke compositions which have not been at least partially neutralized.

Determination of Total Solids

1. Pipet about 0.5 ml. of liquid smoke on a tared 6 cm aluminum moisture dish fitted with a dried Whatman No. 40 filter paper disc, and weigh accurately. The liquid smoke should be clear, and filtration is used to insure this condition.
2. Dry for two hours at 105° C. in a forced draft oven, or for 16 hours at 105° C. in a conventional oven.
3. Cool to room temperature in a desiccator and weigh.
4 Calculate the total solids as percent by weight of the liquid smoke.

Table A lists the most commonly used and commercially available tar-containing aqueous liquid wood smokes along with their manufacturer-reported total acid content. Total solids content, staining power, and percent light transmittance at 590 nm. is also reported for comparison. It will be noted from Table A that the as-purchased (as-is) wood smoke solutions with total acid content values less than about 7 weight percent have high light transmittance values of about 60% and low staining power. Their tar content is so low that their water compatibility is high. Accordingly, there is no need to remove tar from such wood smoke solutions in accordance with this invention. Also, their staining powers are so low that they are not capable of performing the same smoke coloring and smoke flavoring function as the tar-depleted aqueous liquid smoke compositions of this invention. It should be recognized, however, that such low tar content as-is liquid smoke solutions may be concentrated as, for example, by evaporation, and the so-concentrated liquid smoke solution then may acquire the characteristics of a tar-containing liquid smoke which can be advantageously treated to prepare a tar-depleted liquid smoke of this invention. That is, such concentrated tar-containing liquid smoke acquires higher total acid content, total solids, and staining power.

In another preferred embodiment, the tar-depleted aqueous liquid smoke composition of this invention has a total acid content of at least about 7 weight percent and most preferably a total acid content of at least about 9 weight percent. Total acid content of the tar-depleted aqueous liquid smoke is a value of the acid equivalent, since the analytical procedure for determining the total acid content of the tar-depleted aqueous liquid smoke provides a measure of the free acid plus the acid salts resulting from the partial neutralization. Total acid content is a qualitative measure of the staining power (previously defined) of not only tar-containing liquid smokes but also tar-depleted liquid smokes prepared therefrom by any of the methods described herein. If the tar-depleted liquid smoke composition is not at least partially neutralized to a pH no greater than 4 for purposes of this invention, its total acid content is measured by the same dilution-titration procedure previously outlined for measuring a total acid content of tar-containing (as-is) liquid smoke. If the tar-depleted liquid smoke composition is at least partially neutralized to a pH greater than about 4, the total acid content is measured by a steam distillation recovery-titration procedure. This method is theoretically capable of quantifying the acids and acid salts, such as the acetate and formate, which are formed in the at least partially neutralized tar-depleted liquid smoke composition. From a reaction standpoint, the acid percent in the aqueous liquid smoke (in free or salt form) remains constant during at least partial neutralization, e.g., during the Controlled Temperature Neutralization. However, the recovery of these acids is only about 60% due to an inability to achieve complete azeotropic recovery within reasonable distillation volumes. At present, I am not aware of a procedure providing quantitative recovery of all acidic compounds from the tar-depleted liquid smoke regardless of state. Under these circumstances, the results obtained by the steam distillation recovery-titration procedure are multiplied by a factor of 1.4 for conversion to the same total acid content basis used with tar-containing liquid smoke. Measurement of total acid, phenol and carbonyl contents in smoke treated casing is determined by the following procedures.

Determination of Total Acid Content for at least Partially Neutralized Tar-Depleted Liquid Smoke and Treated Casings Produced Therefrom This determination is made from the milliequivalents of sodium hydroxide (NaOH) required to neutralize the milliequivalents of acetic acid (HAc) which are distilled upon acidification of the at least partially neutralized tar-depleted liquid smoke composition or treated casings produced from that composition. "Milliequivalent" refers to the weight in grams of a substance contained in 1 ml. of a solution. The procedure is as follows:

1. Weigh accurately 5 gm. of tar-depleted smoke into a tired 800 ml. Kjeldahl flask. For casings, measure accurately 100 square inches of casing surface.

2. Add boiling chips and 100 ml. of 2% (v/v) $H_2SO_4$ to the flask, the reaction being $$2NaAc + H_2SO_4 \rightarrow 2HAc + Na_2SO_4.$$

3. Place a 500 ml. Erlenmeyer flask containing 100 ml. of deionized water into an ice bath, and use this water to collect the distillate.
4. Connect the sample-containing Kjeldahl flask to the steam distillation apparatus.
5. Distill the sample until the distillate volume in the collecting Erlenmeyer Flask reaches 500 ml.
6. Titrate 100 ml. of distillate with 0.1N NaOH to an end point pH of 7.0 the reaction being $$HAc + NaOH \rightarrow NaAc + H_2O.$$

7. Calculate the measured acid content as weight of acetic acid on the basis that 1 ml. of 0.1N NaOH is equal to 6.0 mg. of HAc, so measured acid content in mg. = ml. of titrant × 6.0.
8. Total acid content = 1.4 + measured acid content in mg.
9. For liquid smoke, express the total acid content as the wt. % of the original liquid smoke sample. For casing, express the total acid content as mg. of acid per 100 $cm^2$ of casing surface.

The total acid content of several tar-depleted liquid smoke compositions of this invention have been measured by this steam distillation recovery-titration procedure, and are listed in Table R. For comparison, the same procedure has been used to measure the total acid content of the as-is tar-containing liquid smokes from which these compositions were derived, and the results are also listed in Table R. It will be noted that the values are quite similar for the same type of liquid smoke, whether it be tar-containing or tar-depleted. For example, as-is Royal Smoke AA liquid smoke has a total acid content of 11.1% and tar-depleted Royal Smoke AA liquid smoke has a total acid content of 12.2%. For further comparison, as-is Royal Smoke AA liquid smoke, as measured by the dilution-titration procedure used by manufacturers and outlined herein for tar-containing liquid smoke, has also been included in Table R. This value of 11.4% is also very similar to the values for Royal Smoke AA based on the steam distillation recovery-titration procedure.

TABLE R

| Total Acid Content of As-Is and Tar-Depleted Liquid Smoke | | | | |
|---|---|---|---|---|
| Smoke Type | Tar Content | Tar Removal Method | Analytical Method | Total Acid Content Wt. % |
| Royal Smoke AA | as-is | Not Removed | Dilution/Titration | 11.4 |
| Royal Smoke AA | " | " | Steam Distillation/Titration | 11.1 |
| Royal Smoke A | " | " | Steam Distillation/Titration | 10.2 |
| Royal Smoke B | " | " | Steam Distillation/Titration | 9.1 |
| Royal Smoke 16 | " | " | Steam Distillation/Titration | 9.8 |
| Charsol C-12 | " | " | Steam Distillation/Titration | 11.8 |
| Charsol X-11 | " | " | Steam Distillation/ | 10.5 |
| Charsol C-6 | " | " | Titration Steam Distillation/Titration | 7.3 |
| Royal Smoke AA | Tar-Depleted | Cont. Temp. Neut. | Steam Distillation/Titration | 12.2 |
| Royal Smoke AA | Tar-Depleted | Solvent Extraction | Steam Distillation/Titration | 11.7 |
| Royal Smoke A | Tar-Depleted | Cont. Temp. Neut. | Steam Distillation/Titration | 11.2 |
| Royal Smoke B | Tar-Depleted | Cont. Temp. Neut. | Steam Distillation/Titration | 8.7 |
| Royal Smoke 16 | Tar-Depleted | Cont. Temp. Neut. | Steam Distillation/Titration | 11.2 |
| Charsol C-12 | Tar-Depleted | Cont. Temp. Neut. | Steam Distillation/Titration | 11.8 |
| Charsol C-12 | Tar-Depleted | Solvent Extraction | Steam Distillation/Titration | 10.5 |
| Charsol x-11 | Tar-Depleted | Cont. Temp. Neut. | Steam Distillation/Titration | 11.2 |
| Charsol C-6 | Tar-Depleted | Cont. Temp. Neut. | Steam Distillation/Titration | 7.6 |

Determination of Phenol and Carbonyl Content in Liquid Smoke-Treated Casings

The samples are prepared by measuring and steam distilling, 0.13 to 0.19 $m^2$ (200 to 300 $in^2$) of casing external surface, as described in the procedure for determination of total acid content.

The reagents for the phenol determination are prepared with distilled water, as follows:
1. Color solution—Dissolve 100 mg. of N-2,6-trichloro-p-benzo-quinoneimine in 25 ml. of ethanol, and refrigerate. For the test, dilute 2 ml. to 30 ml. with water.
2. Buffer, pH 8.3—Dissolve 6.1845 gm. of boric acid in 250 ml. of water. Dissolve 7.45 gm. of potassium chloride in 250 ml. of water. Dissolve 0.64 gm. of NaOH in 80 ml. of water. Mix the three solutions together.
3. 1.0% NaOH—Dissolve 1.0 gm. of NaOH in water. Dilute to 100 ml.
4. Standard solution—Dissolve 0.200 gm. of dimethoxyphenol (DMP) in 2000 ml. water. Then dilute portions of this solution to provide standard solutions containing 1 ppm, 2 ppm, 4 ppm, 6 ppm, and 8 ppm of DMP.

The procedure for phenol determination is a modified Gibbs method, as described in Wild F. Estimation of Organic Compounds, 143, 90–94, University Press, Cambridge, 1953. In this procedure, the sequence is as follows:

1st—In a 25 ml. flask mix the four constituents in the order listed:
 5 ml. buffer pH 8.3
 5 ml. casing distilate standard, or water (blank)
 1 ml. 1% NaOH
 1 ml. dilute color reagent 2nd—Shake, stopper and place in dark for 25 minutes.
3rd—Read absorbance at 580 nm.
4th—Prepare a standard curve using absorbance as the abscissa and standard concentration as the ordinate. Extrapolate concentration of DMP in casing distillates from this curve.
5th—Calculate mg DMP/100 cm$^2$ casing using the following equation:

$$\frac{\text{ppm DMP (from std curve)} \times 500 \text{ (dilution)} \times 0.001 \text{ mg}/\mu\text{g} \times 100}{\text{area of original sample}} = \text{mg/DMP/100 cm}^2$$

The reagents for the carbonyl determination are as follows:
1. Saturated solution of recrystallized 2,4-dinitrophenylhydrazine (DNP) in carbonyl-free methanol.
2. Concentrated HCl.
3. 10% Alcoholic KOH—Dissolve 10 gm. KOH in 20 ml. distilled water and dilute to 100 ml. with carbonyl-free methanol.
4. Standard solutons—Dilute 1 ml. 2-butanone (methyl-ethyl-ketone) (MEK) to 2000 ml. with distilled water. Then dilute portions of this solution to provide standard solutions containing 0.8 ppm, 1.6 ppm. 2.4 ppm. 4.0 ppm, and 8.0 ppm of MEK.

The procedure for carbonyl determination is a modified Lappan-Clark method as described in the article "Colorimetric Method for Determination of Traces of Carbonyl Compounds", Anal. Chem., 23, 542–542 (1951). In this procedure, the sequence is as follows:
1st—In a 25 ml. flask, mix the three constituents in the order listed:
   5 ml. of 2,4 DNP solution
   5 ml. casing distillate, standard, or water (blank) note: casing distillate may require further dilution.
   1 drop concentrated HCl.
2nd—Digest the mixture for 30 minutes in 55° C. water bath.
3rd—After rapidly cooling the digested mixture to room temperature, add 5 ml. 10% alcoholic KOH, shake and let stand for 30 minutes.
4th—Read absorbance at 480 nm.
5th—Prepare a standard curve using absorbance as the abscissa and standard concentration as the ordinate. Extrapolate concentration of MEK in casing distillates from this curve.
6th—Calculate mg MEK/100 cm$^2$ casing using the following equation:

$$\frac{\text{ppm MEK (from std curve)} \times \text{(dilution factor)} \times 0.001 \text{ mg}/\mu\text{g} \times 100}{\text{area of original sample}} = \text{mg MEK/100 cm}^2$$

Absorptive Power

It will be recalled that both the staining power and staining index measurement procedures involve chemical reaction, and apparently for this reason the values measured at ambient temperature decline under elevated temperature aging conditions. As demonstrated in Example XII, this decline is not an accurate indication of the smoke color produced in stuffed food products when using casings aged after treatment with tar-depleted liquid smoke.

Under these circumstances, additional measurement procedures not involving chemical reaction have been used in this invention to determine the coloring capability of liquid smoke and the liquid smoke-treated casing. This measurement procedure for liquid smoke is termed "absorptive power" and the measurement procedure for liquid smoke-treated casing is termed "absorptive index".

In the procedure for measuring absorptive power, 10 mg. of liquid smoke (either tar-containing liquid smoke or tar-depleted liquid smoke) is placed in a disposable vial and 5 ml. of methanol is added thereto. The two components are mixed by inverting the vial, and the ultraviolet absorption value of the mixture is then measured at 340 nm. This particular wave length is selected because spectroscopy measurements with many liquid smokes indicate greatest linearity in this wave length region. Absorptive power measurements for various as-is liquid smokes are included in Table A. A plot of these absorptive power measurements as a function of total acid content or total solids content reveals an approximately linear relationship.

It should be noted that whereas tar content is a significant contributor to the absorptive power measurement, I have discovered that tar only contributes to the staining of food in a minor way, if at all. Thus, in commercially available as-is smokes, absorptive power includes a measurement of tar content and the coloring constituents such as carbonyls, phenols and acids. This means that absorptive power of as-is smokes and tar-depleted smokes may be used to rank them by smoke coloring ability. However, absorptive power of as-is liquid smoke cannot be numerically compared with the absorptive power of tar-depleted smokes of this invention because of the absorptive effect of tars. Further, the absorptive power of tar-depleted smokes prepared by one method cannot be numerically compared with the absorptive power of tar-depleted smokes prepared by another method, because the extent of tar removal by the two methods may be different. For example, tar-depleted liquid smoke prepared by the solvent extraction method has lower tar content than tar-depleted liquid smoke prepared by the controlled neutralization method, based on the same as-is liquid smoke starting material. Unlike staining power, the absorptive power of liquid smokes does not decline with aging.

EXAMPLE XV

A series of absorptive power measurements was performed on various tar-depleted liquid smokes of this invention. One group of as-is liquid smoke samples was treated by the Controlled Temperature Neutralization Method, using NaOH flakes and maintaining the neutralization temperature at 10°–15° C. Another group of as-is samples was first neutralized in the same manner to remove a first tar portion, and then contacted with methylene chloride solvent in a liquid smoke to solvent volume ratio of 10:1 in order to remove a second tar portion in accordance with the Example I procedure. These measurements are summarized in Table S.

TABLE S

| Type of Liquid Smoke | Absorptive Power | | Tar-Depleted by Solvent Extraction |
|---|---|---|---|
| | Tar-Depleted As-Is | by Contr. Temp. Neutralization | |
| Royal Smoke AA | 0.51 | 0.40 | 0.26 (0.26)* |
| Royal Smoke A | 0.45 | 0.36 | 0.30 (0.20)* |
| Royal Smoke B | 0.35 | 0.33 | 0.25 (0.15)* |
| Charsol C-10 | 0.40 | 0.38 | 0.33 |
| Charsol C-6 | 0.22 | 0.22 | 0.17 |
| Charsol C-3 | 0.11 | 0.15 | 0.10 |

*Values in parentheses were obtained from different batches of liquid smoke.

Table S should be interpreted in light of the preceding discussion relating to the effect of tar content on liquid smoke absorptive power.

Inspection of Table S reveals that, in general, the absorptive power of a tar-depleted liquid smoke of this invention is generally somewhat lower than the absorptive power of the tar-containing as-is liquid smoke from which it is derived. This principle does not hold for Charsol C-6 and Charsol C-3 since these liquid smokes are very low in tar content to begin with.

Table S also demonstrates that the absorptive powers of tar-containing liquid smokes useful in the preparation of the tar-depleted liquid smoke solutions of this invention should be at least 0.25, unless multiple treatment steps are to be used. Table S also shows that as-is Charsol C-3 does not satisfy this requirement.

The absorptive power of the tar-depleted liquid smoke composition of this invention must be at least about 0.15 in order to obtain acceptable smoke color on a foodstuff produced in a smoke treated casing of this invention. It appears that the controlled temperature neutralization method provides a tar-depleted liquid smoke which just satisfies the lower limit. In a preferred embodiment the absorptive power of the tar-depleted liquid smoke composition is at least about 0.25.

In another preferred embodiment of the tar-depleted aqueous liquid smoke composition, the absorptive power is at least about 0.25 at 340 nm. wave length, and its light transmittance is at least about 65%. This level of absorptive power is readily achieved as discussed in the immediately preceding paragraph. The procedure for measuring light transmittance and the realization of at least 65% light transmittance is discussed hereinafter.

Absorptive Index

In the procedure for measuring absorptive index, 12.9 cm$^2$ (2 in$^2$) of liquid smoke-treated casing are cut out after drying, and placed in 10 ml. of methanol. After one hour of soaking time, the methanol has extracted all of the smoke components out of the casing, and the ultraviolet absorption value of the resulting smoke component-containing methanol is determined at 340 nm. As with the absorptive power measurement, a 340 nm. wave length was selected because spectroscopy measurements with many liquid smoke extracts from smoke treated casings indicate greatest correlation with smoke loading in this region.

EXAMPLE XVI

A series of absorptive index measurements was made on casings using four different types of tar-depleted liquid smokes of this invention prepared by the Solvent Extraction Method and prepared by the Controlled temperature Neutralization Method. In each instance the neutralization was to a pH of 5.0. The resulting tar-depleted smoke solutions were applied at different loadings to the exterior surface of non-fibrous frankfurter size cellulose gel stock casings in the Example IV manner. The results of these experiments are summarized in FIG. 8, with the Royal Smoke AA derived liquid smoke area shown as diagonal lines, the Charsol C-12 derived liquid smoke area shown as horizontal lines, and the Royal Smoke B derived liquid smoke area shown as vertical lines. In addition, there is a single line based on measurements with a concentrated form of tar-depleted liquid smoke prepared from as-is Royal Smoke AA liquid smoke by the controlled Temperature Neutralization Method.

Figure 8:
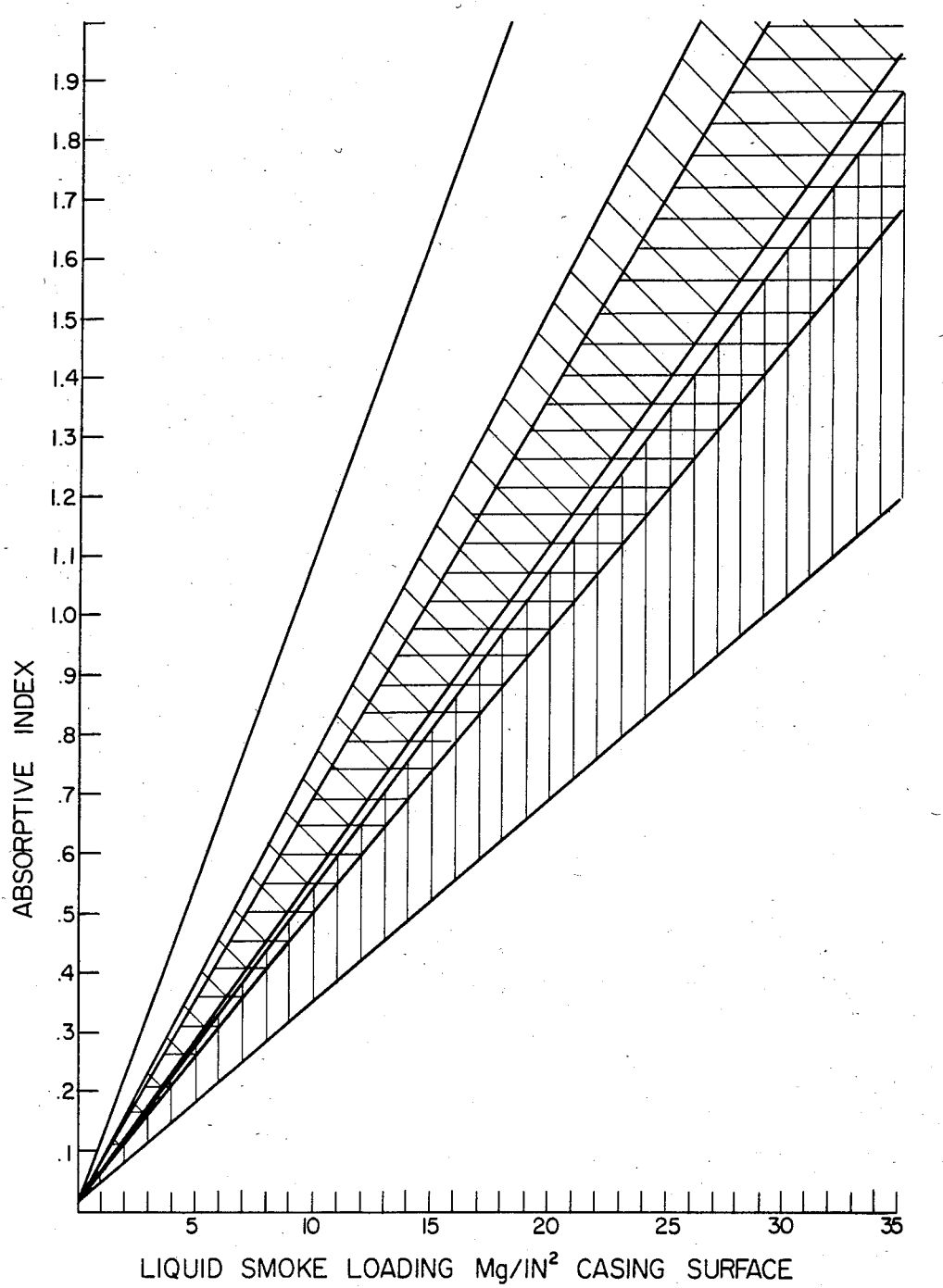
FIG. 8 is a graph showing ultraviolet absorptive index as a function of tar-depleted liquid smoke loading in the food casing.

To use this Figure, the practitioner first selects the desired extent of smoke color in terms of absorptive index, and the type of tar-containing liquid smoke to be used for tar removal by, for example, any of the three methods described herein. Then the practitioner determines the required loading of a particular tar-depleted liquid smoke onto the casing to achieve these characteristics by the practice of this invention. In FIG. 8 1 mg/in$^2$ is equal to 0.155 mg/cm$^2$. The correlation between smoke color and absorptive index is illustrated in the following Example XVII.

EXAMPLE XVII

A series of colorimetric tests was performed using frankfurters prepared in the previously described manner from the Table N formulation in non-fibrous cellulose casings treated with various liquid smokes prepared as previously described. The results of these tests are summarized in Table T.

TABLE T

| Sample Number | Type of Liquid Smoke | Loading Mg/cm$^2$ | Light Absorptive Index | Intensity (-ΔL) |
|---|---|---|---|---|
| 1 | Royal Smoke AA[1] | — | 0.6 | 5.0 |
| 2 | Royal Smoke AA[2] | 1.55 | 0.6 | 3.2 |
| 3 | Royal Smoke AA[1] | 1.63 | 0.5 | 2.9 |
| 4 | Royal Smoke AA[2] | 1.32 | 0.4 | 2.4 |
| 5 | Royal Smoke AA[1] | — | 0.3 | 2.0 |
| 6 | Royal Smoke AA[2] | 0.93 | 0.2 | 2.1 |
| 7 | Royal Smoke AA[2] | 0.62 | 0.19 | 1.4 |
| 8 | Royal Smoke AA[1] | 0.62 | 0.14 | 1.0 |
| 9 | Royal Smoke AA[3] | 1.5 | 0.4 | 2.4 |
| 10 | Royal Smoke AA[4] | 1.75 | 0.5 | 3.4 |

[1] Solvent Extraction Method
[2] Controlled Temperature Neutralization Method
[3] Uncontrolled Temperature Neutralization Method
[4] As-is tar-containing liquid smoke In an attempt to quantify the desired light intensity changes needed to insure adequate color development, $\Delta L$ values were determined and are included in Table T. In this instance, the meat emulsion was 50% beef chuck and 50% regular pork trim, and $\Delta L$ values were considered too low if a 1.4 unit change in light intensity or less occurred between L values measured on a non-smoked control casing compared to a liquid smoke treated casing.

Table T shows that if the absorptive index is less than about 0.2, the smoke loading is 0.62 mg/cm$^2$ (4.0 mg/in$^2$) or less. This level of smoke loading does not generally give a desired reduction in light intensity to the meat product, i.e., color development is generally considered to be insufficient. The medium reduction in light intensity achieved with a liquid smoke loading of 1.32 mg/cm$^2$ (8.5 mg/in$^2$) is quite satisfactory for most end uses, so that the corresponding absorptive index of at least 0.4 represents a preferred embodiment of the invention.

Table T also shows that embodiments of this invention have substantially the same staining ability as the original tar-containing liquid smoke. Comparison of Samples Nos. 2 and 3 with Sample No. 10 shows that the tar content of the liquid smoke has very little influence on the staining ability of the liquid smoke. For practical purposes, the frankfurter light intensity of 2.9 to 3.2 for Casing Samples Nos. 2 and 3, respectively, is substantially equivalent to the frankfurter light intensity of 3.4 for Casing Sample No. 10.

It should be noted that many factors associated with the food emulsion and processing conditions can affect background color and hence L and $\Delta L$ values. For example, meat derives much of its color from myoglobin. The color associated with myoglobin content of meat is known to be dependent upon chemical reaction of myoglobin and the cure which, in turn, is affected by processing conditions such as temperature, humidity, time and air velocity. Accordingly, the $\Delta L$ values in Table T are only relevant for these particular tests.

Other tests have shown that the color retention on aging at ambient temperatures (70° F., 21° C.) is about the same for the tar-depleted liquid smoke treated casings of this invention and tar-containing liquid smoke treated casings. By way of illustration, in a large number of tests using tar-depleted liquid smoke derived from Royal Smoke AA and prepared by the Neutralization Method to a pH of 5.5, the arithmetic average % L over a three-month period for the casings treated by the two types of liquid smoke was about the same; a $\Delta L$ reduction of about 1.6.

All of the previously described experiments relating to absorptive index were performed on either non-fibrous cellulose casings of the same diameter promptly after liquid smoke treatment and drying, or on frankfurters processed therein. Other tests have shown that absorptive index is not significantly affected by variation in casing thickness. Still other tests have shown that absorptive index values for tar-depleted liquid smoke treated fibrous casings of this invention are about the same as the absorptive index values for non-fibrous cellulose casing with the same smoke loading. By way of illustration, an absorptive index of about 0.4 was obtained with a fiber-reinforced cellulosic casing of 115 mm. diameter treated with tar-depleted liquid smoke derived from Royal Smoke AA at a loading of 1.57 mg/cm$^2$ (10.1 mg/in$^2$) of casing external surface. The absorptive index for a non-fibrous cellulose casing treated in the same manner is found from other tests to be about 0.4.

EXAMPLE XVIII

A series of tests was performed on tar-depleted frankfurter size non-fibrous cellulose casings to demonstrate the minor effect of elevated temperature aging on absorptive index. The tar-depleted smoke used to treat these casings was prepared in some instances by the Controlled Temperature Neutralization Method. In other instances a first portion of the tar was removed by this method and the resulting partially tar-depleted liquid smoke was then contacted with a suitable solvent in accordance with the Solvent Extraction Method for further tar depletion. The advantage of this sequence is that the amount of solvent required for the extraction may be reduced.

To prepare the tar-depleted liquid smoke using only the Controlled Temperature Neutralization Method, as-is Royal Smoke AA liquid smoke was neutralized to a pH of 5.0 by the addition of NaOH flakes with the neutralization temperature being controllably maintained at 10°–15° C. In some instances the tar-depleted liquid from this procedure was then contacted with methylene chloride in the Example I manner at a liquid smoke to solvent volume ratio of 10:1. Absorptive index measurements were obtained from the tar-depleted liquid smoke treated casings promptly after treatment and drying, and after storage periods of five and twelve weeks at ambient temperatures. Other samples of the same casing were heated to 100° F. and absorptive index measurements were obtained at the same time intervals. These measurements are summarized in Table U.

TABLE U

| | Absorptive Index of Aged Casing | |
|---|---|---|
| Time and Temperature | Contr. Temp Neutr. | Contr. Temp. Neutr. and Solv. Ext. |
| Initial at 70° F. (21.1° C.) | 0.52 | — |
| Five Weeks at 70° F. (21.1° C.) | 0.49 | 0.37 |
| Twelve Weeks at 70° F. (21.1° C.) | 0.49 | 0.37 |
| Five Weeks at 100° F. (37.8° C.) | 0.54 | 0.35 |
| Twelve Weeks at 100° F. (37.8° C.) | 0.59 | 0.36 |

Table U demonstrates that aging has no significant effect on absorptive index. The absorptive index requirements of this invention are to be understood as based on measurements at ambient temperature.

Light Transmittance

It has previously been stated that the tar-depleted aqueous liquid smoke compositions of this invention must have a light transmittance of at least about 50%. Percent light transmittance (relative to water) is inversely related to tar content of the tested liquid smoke, i.e. high tar content results in a cloudy liquid with low light transmittance. The procedure for measuring light transmittance is to thoroughly mix a 1 ml. aliquot of the liquid smoke with 10 ml. of water, and determine its turbidity-transmittance at 590 nm., the wave length of light, on a spectrophotometer. The higher the percent transmittance reading, the lower the residual tar concentration in the liquid smoke composition.

The desired light transmittance of at least 50%, and preferably 65%, maybe achieved by any of the aforedescribed methods for preparing the tar-depleted aqueous liquid smoke compositions, separately or in combination, i.e. the Neutralization Method, the Controlled Temperature Neutralization Method, or the Solvent Extraction Method. Moreover, all of the tar-depleted liquid smoke compositions prepared in the foregoing Examples I and II and used in Examples III through XVIII had light transmitance values of at least 50%.

When using the Neutralization Method or the Controlled Temperature Neutralization Method, the practitioner should mix a sufficient quantity of high pH constituent with the as-is liquid smoke (typically having a light transmittance of less than about 10%) to raise the pH above about 4 and preferably at least 6, whereupon the percent light transmittance increases to a high level. As shown in FIG. 5 of the previously referenced copending application "Controlled Temperature Neutralization Method", this increase is very rapid, and the slope of a percent light transmittance versus liquid smoke pH curve is nearly vertical. Above a pH of about 8 the tars tend to become resolubilized, so there is no advantage to increasing the pH above this level. Light transmittance values of tar-depleted liquid smoke compositions prepared from several as-is tar-containing liquid smokes were measured at a pH of about 6, and are summarized in Table V. These compositions were prepared by the Controlled Temperature Neutralization Method, using the controlled addition of 50% NaOH liquid and maintaining the mixture temperature at about 15° C. during the mixing by employing an immersed coil-type portable refrigeration unit.

TABLE V

| Light Transmittance at pH 6 for Tar-Depleted Liquid Smoke | |
|---|---|
| Source Type Smoke | % Light Transmittance |
| Charsol C-10 | 96 |
| Charsol C-12 | 82 |
| Royal Smoke B | 95 |
| Royal Smoke AA | 93 |

If the practitioner chooses the Solvent Extraction Method to prepare the tar-depleted liquid smoke composition, the desired percent light transmittance may be achieved by selection of the solvent and also by controlling the volume ratio of as-is liquid solution to solvent. In general, the highest levels of light transmittance are achieved with the greatest quantity of solvent relative to liquid smoke, but of course the liquid extraction operating cost increases with increasing liquid solvent usage. Representative light transmittance values for various suitable solvents at specified Royal Smoke AA to solvent ratios are listed in Table W.

TABLE W

| Liquid Smoke Light Transmittance by Solvent Extraction | | |
|---|---|---|
| Solvent | Liquid Smoke/ Solvent Volume Ratio | % Light Transmittance |
| Methylene chloride | 12:1 | 92 |
| Bromochloromethane | 3:1 | 78 |
| Chloroform | 6:1 | 90 |
| Hexyl Cellosolve | 1:1 | 98 |
| Propionaldehyde | 1:1 | 87 |
| Ethyl acetate | 1:1 | 92 |
| Ethyl ether | 1:1 | 74 |
| Methyl isobutyl ketone | 1:1 | 92 |

EXAMPLE XIX

It has previously been indicated that the tar-depleted liquid smoke composition of this invention preferably has a light transmittance of at least 50% across the entire visible range, as an indicator that a substantial portion of the tar content has been removed so as to avoid tarring during casing treatment therewith. This preference was demonstrated by a series of tests in which Royal Smoke AA was contacted under extraction conditions in the previously described manner with methylene chloride solvent in various liuid smoke solutions to liquid solvent volume ratios. A tar-depleted liquid smoke fraction was separated and its light transmittance was measured, also in the previously described manner. The weight percent nonvolatiles (including tars) in this tar-depleted liquid smoke fraction was also determined. The data from these tests is summarized in Table X and the FIG. 9 graph.

TABLE X

| Light Transmittance v. Percent Nonvolatiles | | |
|---|---|---|
| Liquid Smoke/Solvent | % Transmittance | % Nonvolatiles |
| As-is liquid smoke (no solvent) | 0 | 8.9 |
| 50/1 | 3.5 | 8.5 |
| 33/1 | 8.1 | 8.4 |
| 25/1 | 27.7 | 8.0 |
| 20/1 | 48.7 | 6.5 |
| 15/1 | 63.2 | 5.9 |
| 14/1 | 70.2 | 6.0 |
| 10/1 | 72.0 | 6.0 |
| 10/1 | 76.7 | 5.9 |
| 7/1 | 77.1 | 5.6 |

Figure 9:
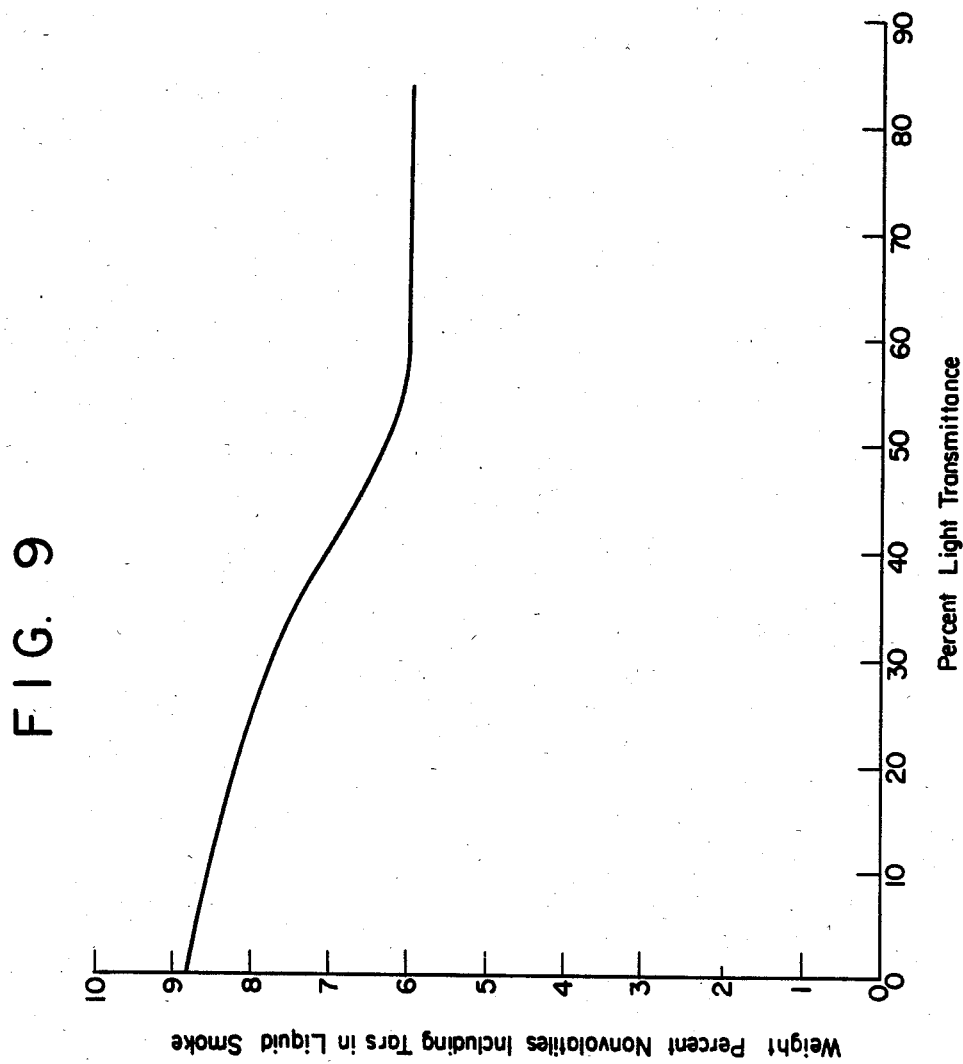
FIG. 9 is a graph showing percent nonvolatiles (including tars) in liquid smoke as a function of percent light transmittance.

Inspection of this data and FIG. 9 indicates that light transmittance is heavily influenced by the nonvolatiles, (including tars) content in the 0 to about 50% light transmittance range. That is, one must progressively reduce the liquid smoke's tar content by, for example, Solvent Extraction or Controlled Temperature Neutralization, to progressively increase the liquid smoke's light transmittance from 0 to about 50%. When sufficient tar has been removed to achieve a light transmittance of at least about 50%, a plateau is reached and further improvement in light transmittance does not primarily depend on additional tar removal.

Although preferred embodiments of this invention have been described in detail, it is contemplated that modifications thereof may be made and some features may be employed without others, all within the spirit and scope of the invention. For example it should be understood that as-is tar-containing liquid smokes which are advantageously treatable for tar removal by the methods described herein, may be further concentrated by well-known techniques before or after treatment to prepare the tar-depleted liquid smoke composition of this invention. This may be desirable if the practitioner wishes to apply a highly concentrated form of tar-depleted liquid smoke to a casing wall.

The tar-depleted liquid smoke treatment of a tubular food casing surface in the manner of this invention is preferably practiced under controlled environmental conditions wherein the presence of minut metal particles is minimized. This is an important requirement since metal wear particles (primarily iron, copper, brass) in contact with the casing react with the liquid smoke coating, resulting in auto-oxidation, discoloration and even cellulose degradation of the treated casing. The discoloration and cellulose degradation occur only in the immediate area of the metal contamination and seldom exceed 2-10 mm diameter in size. The cellulose degradation may sometimes be severe enough to cause casing breakage during stuffing or processing. The materials of construction of the treatment apparatus is an important factor in minimizing minute metal particles. These materials should be (1) of high wear resistance, and (2) nonreactive to the liquid smoke. It has been determined that certain metals and alloys are compatible with these stringent requirements. They are: certain aluminum alloys, chrome plating, tin alloys, and certain stainless steels. Care must also be used in other steps of casing manufacture and handling to minimize the presence of minute metal particles.

EXAMPLE XX

Four samples of tar-depleted liquid smoke were prepared with varying light transmittance values using the controlled temperature neutralization method. The as-is liquid smoke solution used was "Charsol C-12", and had an absorptive power of about 0.5 at a wave length of 340 nm, and a pH of about 2. Each of the four samples were prepared essentially as in Example II except each was neutralized to a different pH value to give a differing light transmittance value for each of the resulting tar-depleted liquid smoke solutions. The samples were neutralized by the addition of flake NaOH and the temperature was maintained during the neutralization within a temperature between about 10° C. to about 25° C. using refrigeration cooling coils. NaOH was used in such an amount to neutralize the samples to achieve light transmittance values of about 20%, 50%, 60% and 80%. This was achieved by adding an amount of NaOH to give the final pH indicated in Table Y. After the desired amount of NaOH was added the tar precipitates were separated from the supernatant liquid by filtration to give a tar-depleted liquid smoke. The light transmittance was measured by diluting 1 ml of tar-depleted liquid smoke with 10 ml of water, and measuring transmittance relative to water on a spectrophotometer at a wave length of about 715 nm. A control sample was also made in the same manner, except the as-is smoke was neutralized to a pH of about 6.0. In Table Y are shown the pH and the light transmittance of the tar-depleted liquid smoke product.

TABLE Y

| Sample No. | pH | Light Trans. |
|---|---|---|
| 1 | 4.69 | 20.8% |
| 2 | 4.60 | 50.2% |
| 3 | 4.70 | 61.3% |
| 4 | 4.95 | 84.3% |
| Control | 5.92 | 92.% |

The above prepared samples were applied to a gel stock nonfibrous frankfurter casing (size No. 25) to give a loading of 15.5 grams per square meter of liquid tar-depleted liquid smoke using the apparatus and method described in Example V. The casings were dried as in Example V for about 3 minutes at a drying temperature between about 80° C. to about 120° C.

During the application of the tar-depleted liquid smoke, the casing was observed for tar spots thereon and the drying guides and the squeeze rolls of the drying unit were observed for tar buildup. The results of the observations are summarized in Table Z.

TABLE Z

| Sample | Light Trans. | Observation |
|---|---|---|
| 1 | 20.8% | Tar deposits formed immediately on casing. Heavy sticking on squeeze rolls. Tar deposits formed on drying guides. |
| 2 | 50.2% | Tar deposits formed immediately on casing. Slight sticking on squeeze rolls. Tar deposits formed on drying guides. |
| 3 | 61.3% | Tar deposits formed immediately on casing. No sticking on squeeze rolls. Tar deposits formed on drying guides. |
| 4 | 84.3% | Tar deposits formed on casing after five minutes. No sticking on squeeze rolls. Tar deposits formed on drying guides. |
| Control | 92% | No tar spots on casing. No tar deposits on drying guides or squeeze rolls. |

As can be seen from the above results, the problems due to the presence of tar in the depleted liquid smoke solution, as reflected by the lower light transmittance values, become less as the tar content is lowered or the light transmittance value is increased. With tar-depleted liquid smoke having a light transmittance at about 20%, the difficulties caused by the tars, in particular the sticking on the squeeze rolls, render the coating process inoperable and the composition is, therefore, unacceptable. As the light transmittance rises to about 50%, there are still difficulties, such as slight sticking on the rolls and commercially undesirable tar spots on the casing, but the application of the llquid smoke can still be carried out and a usable casing can still be made. At a light transmittance value of about 60%, a casing can be prepared that has few tar spots and is commercially more preferable, although spots are formed on the casing after extended periods of operation. At the higher light transmittance values of Sample 4 and the control a casing is formed that is commercially acceptable, there being no tar spots thereon, and the coating process can be carried out on a continuous basis without tar-buildup or sticking difficulties that would lead to shutting down of the process.

EXAMPLE XXI

Four samples of tar-depleted liquid smoke were prepared with varying light transmittance values using the solvent extraction method. The as-is liquid smoke solution used was "Charsol C-12", and had an absorptive power of about 0.5 at a wave length of 340 nm, and a pH of about 2. Each of the three samples was prepared essentially as in Example I, except that each sample was solvent extracted to give a differing light transmittance value for each of the resulting tar-depleted liquid smoke solutions. To an amount of methylene chloride were added about 3785 ml of the as-is liquid smoke, and the liquids were mixed by stirring or shaking. The methylene chloride containing the tars was separated from the liquid smoke by decanting. The light transmittance was varied by varying the amount of methylene chloride used in the extraction. The light transmittance was measured by diluting 1 ml of tar-depleted liquid smoke with 10 ml of water and measuring transmittance relative to water on a Hitachi Model 100-60 spectrophotometer at a wave length of 590 nm. In Table AA are shown the amount, for each sample, of methylene chloride (MeCl₂) to solvent extract the tars from the as-is smoke, and the pH and light transmittance of the tar-depleted liquid smoke product.

TABLE AA

| Sample No. | MeCl₂ (ml) | pH | Light Trans. |
|---|---|---|---|
| 1 | 155 | 2.2 | 40.% |
| 2 | 190 | 2.2 | 50.% |
| 3 | 315 | 2.2 | 60.% |
| 4 | 375 | 2.2 | 84.% |

The above prepared samples were applied to a gel stock nonfibrous frankfurter casing (size No. 25) using the apparatus and method of Example IV to give a loading of 15.5 grams liquid smoke per square meter of casing surface. The casings were dried as in Example IV for 3 minutes at a drying temperature between about 80° C. and about 120° C.

During the application of the tar-depleted liquid smoke, the casing was observed for tar spots thereon and the drying guides and the sqeez rolls of the drying unit were observed for tar buildup. The results of the observations are summarized in Table BB.

TABLE BB

| Sample | Light Trans. | Observation |
|---|---|---|
| 1 | 40.% | Tar deposits formed immediately on casing. Slight sticking on squeeze rolls. Tar deposits formed on drying guides. |
| 2 | 50.% | Tar deposits formed on casing after five minutes. No sticking on squeeze rolls. Tar deposits formed on drying guides. |
| 3 | 60.% | Tar deposits formed on casing after twenty minutes. No sticking on squeeze rolls. Tar deposits formed on drying guides. |
| 4 | 84.% | No tar deposits on the casing or dryer guides. No sticking on squeeze rolls with extended operating (12 hours). |

As can be seen from the above results, the problems due to the presence of tar in the tar-depleted liquid smoke solution, as reflected by the lower light transmittance values, become less as the tar content is lowered or the light transmittance value is increased. With tar-depleted liquid smoke having a light transmittance of about 40%, the difficulties caused by the tars, in particular the sticking on the squeeze rolls, render the coating process inoperable and this composition is, therefore, unacceptable. At a light transmittance of about 50%, there are still difficulties, such as the formation of tar spots on the casing after a period of running time. However, spot free casings are made during the initial running time which are acceptable from a commercial standpoint. As the light transmittance rises to about 60%, the period of running time before the tar spots appear on the casing is longer and the coating process becomes, therefore, more practical. At a light transmittance of about 84% an extended running time can be accomplished without any problems of spotting and tar-buildup. Tar-depleted liquid smokes having a high light transmittance, can be used in a coating process without encountering any problems involving tar-buildup or other related difficulties that lead to the shutting down of the coating process.

What is claimed is:

1. A natural wood-derived tar-depleted aqueous liquid smoke composition with smoke coloring and smoke flavoring capability, having an absorptive power of at least about 0.25 at 340 nm. wavelength, and having a light transmittance at 590 nm. wavelength of at least about 50%, said tar-depleted aqueous liquid smoke composition being totally miscible with water.

2. A tar-depleted aqueous liquid smoke composition according to claim 1, having a light transmittance of at least about 65%.

3. A tar-depleted aqueous liquid smoke composition according to claim 1, which is derived from a tar-containing liquid smoke solution having a total acid content of at least about 7 weight %.

4. A tar-depleted aqueous liquid smoke composition according to claim 1, which is derived from a tar-containing liquid smoke solution having a total acid content of at least about 9 weight %.

5. A tar-depleted aqueous liquid smoke composition according to claim 1, having a total acid content of at least about 7 weight %.

6. A tar-depleted aqueous liquid smoke composition according to claim 1, having a total acid content of at least about 9 weight %.

7. A tar-depleted aqueous liquid smoke composition according to claim 1, which is derived from a tar-containing liquid smoke composition, and which has a phenol content which is less than one-half of the phenol content of said tar-containing liquid smoke on a weight % basis.

8. A tar-depleted aqueous liquid smoke composition according to claim 1, which is at least partially neutralized to a pH greater than about 2.5.

* * * * *